United States Patent
Hwang et al.

(10) Patent No.: US 10,250,374 B2
(45) Date of Patent: Apr. 2, 2019

(54) HARQ OPERATION WHEN TDD CELL AND FDD CELL ARE INCLUDED IN CARRIER AGGREGATION

(71) Applicant: LG ELECTRONICS INC., Seoul (KR)

(72) Inventors: Daesung Hwang, Seoul (KR); Joonkui Ahn, Seoul (KR); Dongyoun Seo, Seoul (KR); Suckchel Yang, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/026,771

(22) PCT Filed: Sep. 1, 2014

(86) PCT No.: PCT/KR2014/008121
§ 371 (c)(1),
(2) Date: Apr. 1, 2016

(87) PCT Pub. No.: WO2015/064906
PCT Pub. Date: May 7, 2015

(65) Prior Publication Data
US 2016/0254899 A1    Sep. 1, 2016

Related U.S. Application Data

(60) Provisional application No. 61/897,224, filed on Oct. 30, 2013, provisional application No. 61/898,490, (Continued)

(51) Int. Cl.
*H04J 3/00* (2006.01)
*H04L 5/14* (2006.01)
(Continued)

(52) U.S. Cl.
CPC .............. *H04L 5/14* (2013.01); *H04L 1/0039* (2013.01); *H04L 1/0077* (2013.01);
(Continued)

(58) Field of Classification Search
CPC ........ H04L 5/14; H04L 5/0055; H04L 1/0039; H04L 1/0077; H04L 1/1812;
(Continued)

(56) References Cited

U.S. PATENT DOCUMENTS

| | | | |
|---|---|---|---|
| 2012/0087254 A1 | 4/2012 | Yin et al. | |
| 2012/0087314 A1* | 4/2012 | Maeda | H04L 5/001 370/328 |

(Continued)

FOREIGN PATENT DOCUMENTS

| | | |
|---|---|---|
| CN | 101989898 | 3/2011 |
| CN | 102237981 | 11/2011 |

OTHER PUBLICATIONS

"UPlink HARQ timing in TDD-FDD carrier aggregation", 3GPP TSG RAN WG1 Meeting #74bis, Oct. 7-11, 2013, R1-134331.*

(Continued)

*Primary Examiner* — Peter Cheng
(74) *Attorney, Agent, or Firm* — Lee Hong Degerman Kang & Waimey

(57) ABSTRACT

One disclosure of the present specification provides a method for operating a HARQ from user equipment (UE). The method comprises the steps of: the UE receiving downlink data from each cell, when at least one TDD-based cell and at least one FDD based cell are established according to carrier aggregation (CA), a specific TDD-based cell is established as a primary cell of the carrier aggregation (CA), and the at least one FDD-based cell is established as a secondary cell of the carrier aggregation (CA); the UE confirming a PUCCH format to be used for transmitting a (Continued)

HARQ ACK/NACK for the downlink data; and the UE determining the number of bits for transmitting the HARQ ACK/NACK when use of the specific PUCCH format for transmitting the HARQ ACK/NACK is confirmed.

11 Claims, 13 Drawing Sheets

Related U.S. Application Data filed on Nov. 1, 2013, provisional application No. 61/910,047, filed on Nov. 28, 2013, provisional application No. 61/930,466, filed on Jan. 22, 2014, provisional application No. 61/932,723, filed on Jan. 28, 2014, provisional application No. 61/952,877, filed on Mar. 14, 2014, provisional application No. 61/969,851, filed on Mar. 25, 2014.

(51) Int. Cl.
| | |
|---|---|
| *H04L 1/00* | (2006.01) |
| *H04L 1/18* | (2006.01) |
| *H04L 5/00* | (2006.01) |
| *H04W 72/04* | (2009.01) |
| *H04W 88/02* | (2009.01) |

(52) U.S. Cl.
CPC .......... *H04L 1/1812* (2013.01); *H04L 1/1829* (2013.01); *H04L 5/0055* (2013.01); *H04W 72/0413* (2013.01); *H04W 88/02* (2013.01)

(58) Field of Classification Search
CPC ............ H04L 1/1829; H04W 72/0413; H04W 76/046; H04W 88/02
USPC ......................................................... 370/280
See application file for complete search history.

(56) References Cited

U.S. PATENT DOCUMENTS

| | | | | |
|---|---|---|---|---|
| 2013/0114474 | A1* | 5/2013 | Fu ......................... | H04L 5/0055 |
| | | | | 370/280 |
| 2015/0023229 | A1* | 1/2015 | Yin ....................... | H04L 5/0032 |
| | | | | 370/280 |

OTHER PUBLICATIONS

PCT International Application No. PCT/KR2014/008121, International Search Report dated Nov. 28, 2014, 2 pages.
Etri, "Uplink HARQ timing in TDD-FDD carrier aggregation", R1-134331, 3GPP TSG RAN WG1 Meeting #71bis, Oct. 2013, 5 pages.
Alcatel-Lucent Shanghai Bell, "Scheduling and HARQ timing for TDD-FDD carrier aggregation", R1-134810, 3GPP TSG RAN WG1 Meeting #74bis, Oct. 2013, 4 pages.
Pantech, "Remaining details on HARQ-ACK transmission for TDD CA with different TDD UL-DL configuration"; R1-123322, 3GPP TSG RAN1 #70, Aug. 2012, 9 pages.
The State Intellectual Property Office of the People's Republic of China Application Serial No. 201480059754.2, Office Action dated Jun. 5, 2018, 6 pages.
Samsung, "HARQ-ACK Resource Indication in PUCCH for DL CA," 3GPP TSG RAN WG1 #62bis, R1-105359, Oct. 11-15, 2010, 4 pages.
Qualcomm Inc. et al., "Clarification on UE's capability of supporting PUCCH format 3," 3GPP TSG-RAN WG1 #67, R1-114470, Nov. 14-18, 2011, 4 pages.
Huawei, HiSilicom, "Details of TDD-FDD CA," 3GPP TSG RAN WG1 #74bis, R1-134056, Oct. 7-11, 2013, 6 pages.
Huawei, HiSilicom, "Discussion of TDD-FDD CA with more than two carriers," 3GPP TSG RAN WG1 #74bis, R1-134349, Oct. 7-11, 2013, 3 pages.

* cited by examiner (b) MULTIPLE CCS (a) SINGLE CC

HARQ OPERATION WHEN TDD CELL AND FDD CELL ARE INCLUDED IN CARRIER AGGREGATION

CROSS-REFERENCE TO RELATED APPLICATIONS

This application is the National Stage filing under 35 U.S.C. 371 of International Application No. PCT/KR2014/008121, filed on Sep. 1, 2014, which claims the benefit of U.S. Provisional Application No. 61/897,224, filed on Oct. 30, 2013, 61/898,490, filed on Nov. 1, 2013, 61/910,047, filed on Nov. 28, 2013, 61/930,466, filed on Jan. 22, 2014, 61/932,723, filed on Jan. 28, 2014, 61/952,877, filed on Mar. 14, 2014 and 61/969,851 filed on Mar. 25, 2014, the contents of which are all hereby incorporated by reference herein in their entirety.

BACKGROUND OF THE INVENTION

Field of the Invention

The present invention relates to mobile communication.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink.

Such LTE may be divided into a frequency division duplex (FDD) type and a time division duplex (TDD) type.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, as the spread of smart phones, users require faster data communications. As such, at the moment when high-speed data communications are required, it may be inefficient for a mobile carrier to provide an FDD-based service only or a TDD-based service only conventionally in the aspect of frequency use. As a result, it may be desirable to have a UE to access both to a cell that uses FDD and to a cell that uses TDD at the same time. In order to realize this, there is talk to combine an FDD-based cell and a TDD-based cell in carrier aggregation (CA) technology in the next generation mobile communication system.

However, in case that the FDD-based cell and the TDD-based cell are included in the carrier aggregation (CA) as above, the HARQ operation of a UE becomes problematic.

SUMMARY OF THE INVENTION

Accordingly, a disclosure of the specification has been made in an effort to solve the aforementioned problem.

In order to achieve the aforementioned purpose, one disclosure of the present specification provides a method for performing a HARQ operation. The method may be performed by a user equipment (UE) and comprise: if at least one TDD-based cell and at least one FDD-based cell are configured according to a carrier aggregation (CA), if the at least one TDD-based cell is configured as a primary cell of the CA, if the at least one FDD-based cell is configured as a secondary cell of the CA, receiving downlink data from each cell; and determining the number of HARQ ACK/NACK bits to be transmitted in a physical uplink control channel (PUCCH) format. Here, a maximum number of cells included in the CA may be limited such that the determined number of HARQ ACK/NACK bits does not exceed a maximum number of bits allowed in the PUCCH format.

If the PUCCH format corresponds to a PUCCH format 3 so that the allowed maximum number of bits is 20, the maximum number cells included in the CA may be limited.

If the PUCCH format corresponds to a PUCCH format 3 so that the allowed maximum number of bits is 20 and if an uplink-downlink (UL-DL) configuration of the specific TDD-based cell corresponding to the primary cell may correspond to one of UL-DL configurations 2, 3, 4 and 5. The maximum number cells included in the CA may be limited.

The method may further comprise: receiving a radio resource control (RRC) signal including a configuration for the PUCCH format.

The CA may include: the primary cell based on TDD, at least one or more secondary cells based on FDD, at least one or more secondary cells based on TDD.

In order to achieve the aforementioned purpose, one disclosure of the present specification provides a method for receiving a HARQ ACK/NACK. The method may be performed by a TDD-based cell and comprise: configuring, by the TDD-based cell, a carrier aggregation including a TDD-based cell for a primary cell and a FDD-based cell for a secondary cell; determining, by the TDD-based cell corresponding to the primary cell, a physical uplink control channel (PUCCH) format to be used by a user equipment (UE); transmitting, by the TDD-based cell corresponding to the primary cell, downlink data to the UE; and receiving the HARQ ACK/NACK with respect to the downlink data. Here, a maximum number of cells included in the CA is limited such that the number of bits of the received HARQ ACK/NACK may do not exceed a maximum number of bits allowed in the PUCCH format.

Advantageous Effects

According to a disclosure of the present specification, the aforementioned problem of the conventional technique can be solved.

DESCRIPTION OF EXEMPLARY EMBODIMENTS

Figure 1:
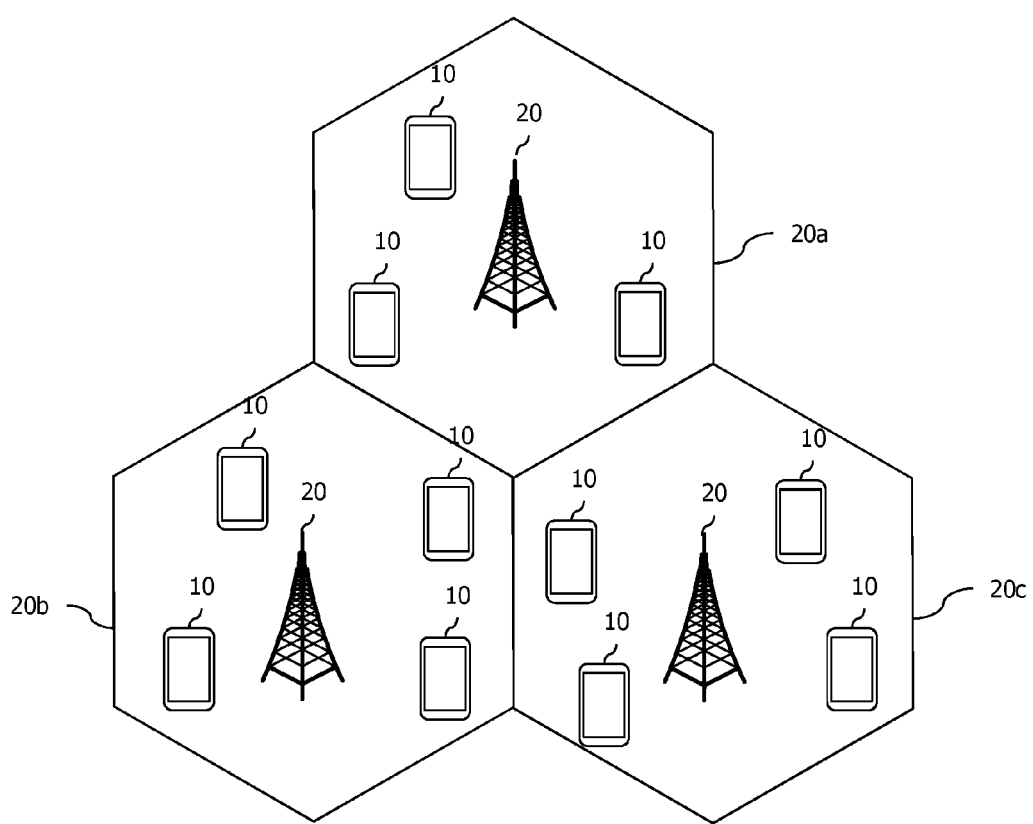
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 shows a wireless communication system.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
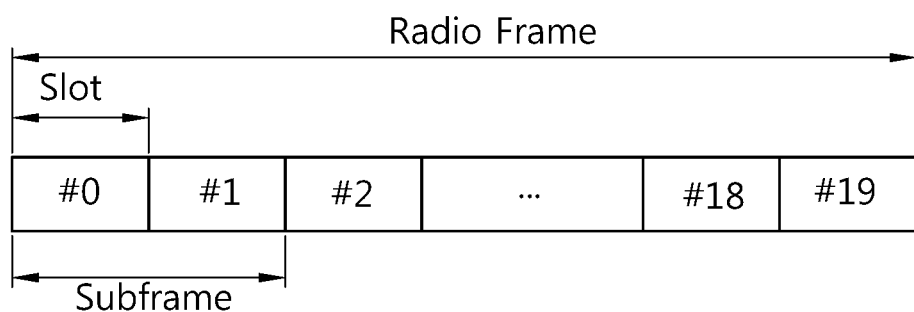
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
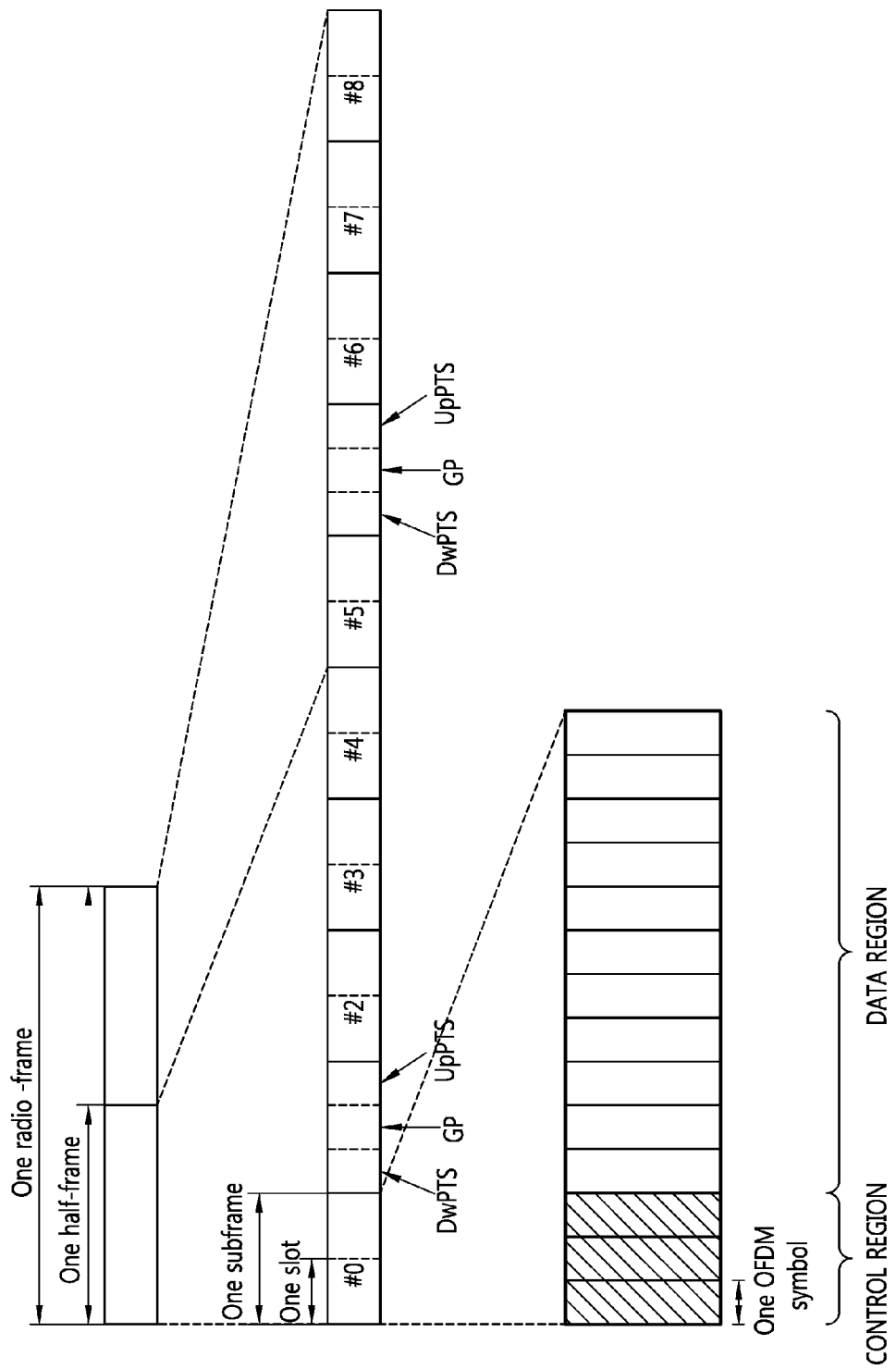
FIG. 3 illustrates the architecture of a downlink radio frame according to time division duplex (TDD) in 3GPP LTE.

FIG. 3 shows an example of a resource grid for one uplink or downlink slot in 3GPP LTE.

For this, 3GPP TS 36.211 V10.4.0 (2011-12) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
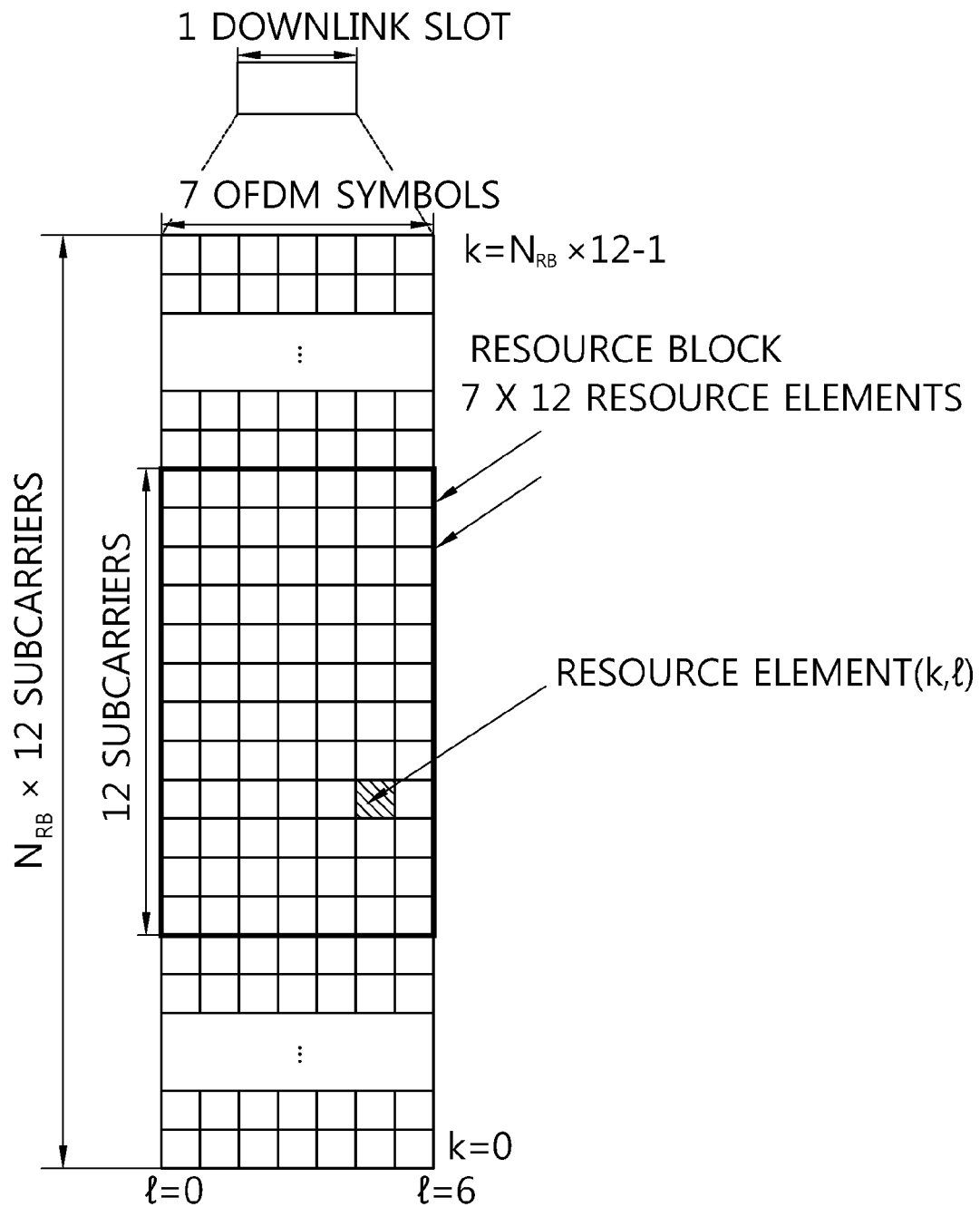
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., $N_{RB}$, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., $N_{UL}$, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
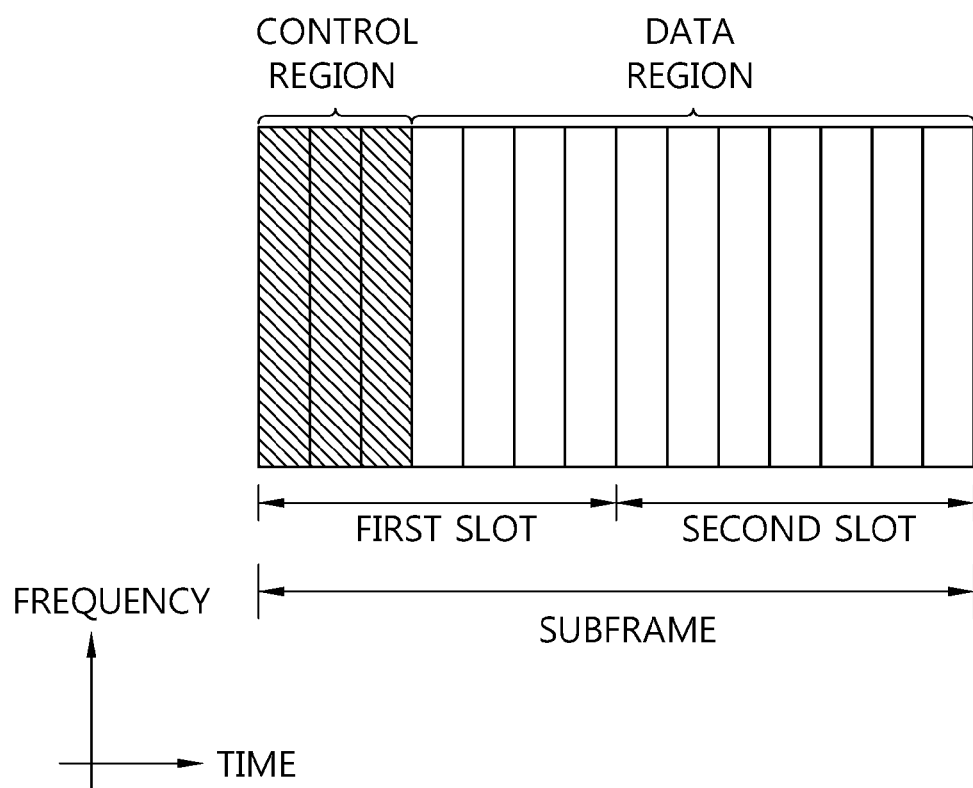
FIG. 5 illustrates the architecture of a downlink subframe.

FIG. 5 illustrates the architecture of a downlink sub-frame.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of an available PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Meanwhile, a UE is unable to know that the PDCCH of its own is transmitted on which position within control region and using which CCE aggregation level or DCI format. Since a plurality of PDCCHs may be transmitted in one subframe, the UE monitors a plurality of PDCCHs in every subframe. Here, the monitoring is referred to try to decode the PDCCH by the UE according to the PDCCH format.

In 3GPP LTE, in order to decrease the load owing to the blind decoding, a search space is used. The search space may be referred to a monitoring set of CCE for the PDCCH. The UE monitors the PDCCH within the corresponding search space.

When a UE monitors the PDCCH based on the C-RNTI, the DCI format and the search space which is to be monitored are determined according to the transmission mode of the PDSCH. The table below represents an example of the PDCCH monitoring in which the C-RNTI is setup.

TABLE 2

| Transmission mode | DCI format | Search space | Transmission mode of PDSCH according to PDCCH |
| --- | --- | --- | --- |
| Transmission mode 1 | DCI format 1A | Public service and terminal specific | Single antenna port, port 0 |
|  | DCI format 1 | Terminal specific | Single antenna port, port 0 |
| Transmission mode 2 | DCI format 1A | Public service and terminal specific | Transmit diversity |
|  | DCI format 1 | Terminal specific | Transmit diversity |
| Transmission mode 3 | DCI format 1A | Public service and terminal specific | Transmit diversity |
|  | DCI format 2A | Terminal specific | CDD(Cyclic Delay Diversity) or transmit diversity |
| Transmission mode 4 | DCI format 1A | Public service and terminal specific | Transmit diversity |
|  | DCI format 2 | Terminal specific | Closed-loop spatial multiplexing |
| Transmission mode 5 | DCI format 1A | Public service and terminal specific | Transmit diversity |
|  | DCI format 1D | Terminal specific | MU-MIMO(Multi-user Multiple Input Multiple Output) |
| Transmission mode 6 | DCI format 1A | Public service and terminal specific | Transmit diversity |
|  | DCI format 1B | Terminal specific | Closed-loop spatial multiplexing |
| Transmission mode 7 | DCI format 1A | Public service and terminal specific | If the number of PBCH transmisison ports is 1, single antenna port, port 0. Otherwise, transmit diversity |
|  | DCI format 1 | Terminal specific | Single antenna port, port 5 |
| Transmission mode 8 | DCI format 1A | Public service and terminal specific | If the number of PBCH transmisison ports is 1, single antenna port, port 0. Otherwise, transmit diversity |
|  | DCI format 2B | Terminal specific | Dual layer transmisison (port 7 or 8), or single antenna port, port 7 or 8 |
| Transmission mode 9 | DCI format 1A | Public service and terminal specific | Non-MBSFN sub-frame: if the number of PBCH antenna ports is 1, port 0 is used as independent antenna port. Otherwise, transmit Diversity MBSFN sub-frame: port 7 as independent antenna port |
|  | DCI format 2C | Terminal specific | 8 transmisison layers, ports 7-14 are used or port 7 or 8 is used as independent antenna port |
| Transmission mode 10 | DCI 1A | Public service and terminal specific | Non-MBSFN sub-frame: if the number of PBCH antenna ports is 1, port 0 is used as independent antenna port. Otherwise, transmit Diversity MBSFN sub-frame: port 7 as independent antenna port |
|  | DCI format 2D | Terminal specific | 8 transmisison layers, ports 7-14 are used or port 7 or 8 is used as independent antenna port |

The usage of the DCI format is classified as shown in Table 3 below.

TABLE 3

| DCI format | Contents |
| --- | --- |
| DCI format 0 | Used in PUSCH scheduling |
| DCI format 1 | Used in scheduling of one PDSCH codeword |
| DCI format 1A | Used in compact scheduling of one PDSCH codeword and random access process |

TABLE 3-continued

| DCI format | Contents |
|---|---|
| DCI format 1B | Used in compact scheduling of one PDSCH codeword having precoding information |
| DCI format 1C | Used in very compact scheduling of one PDSCH codeword |
| DCI format 1D | Used in precoding and compact scheduling of one PDSCH codeword having power offset information |
| DCI format 2 | Used in PDSCH scheduling of terminals configured in closed-loop spatial multiplexing mode |
| DCI format 2A | Used in PDSCH scheduling of terminals configured in open-loop spatial multiplexing mode |
| DCI format 2B | DCI format 2B is used for resouce allocation for dual-layer beam-forming of PDSCH. |
| DCI format 2C | DCI format 2C is used for resouce allocation for closed-loop SU-MIMO or MU-MIMO operation to 8 layers. |
| DCI format 2D | DCI format 2C is used for resouce allocation to 8 layers. |
| DCI format 3 | Used to transmit TPC command of PUCCH and PUSCH having 2 bit power adjustments |
| DCI format 3A | Used to transmit TPC command of PUCCH and PUSCH having 1 bit power adjustment |
| DCI format 4 | Used in PUSCH scheduling of uplink (UP) operated in multi-antenna port transmisison mode |

The uplink channels include a PUSCH, a PUCCH, an SRS (Sounding Reference Signal), and a PRACH (physical random access channel).

The uplink channels include a PUSCH, a PUCCH, an SRS (Sounding Reference Signal), and a PRACH (physical random access channel).

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 6:
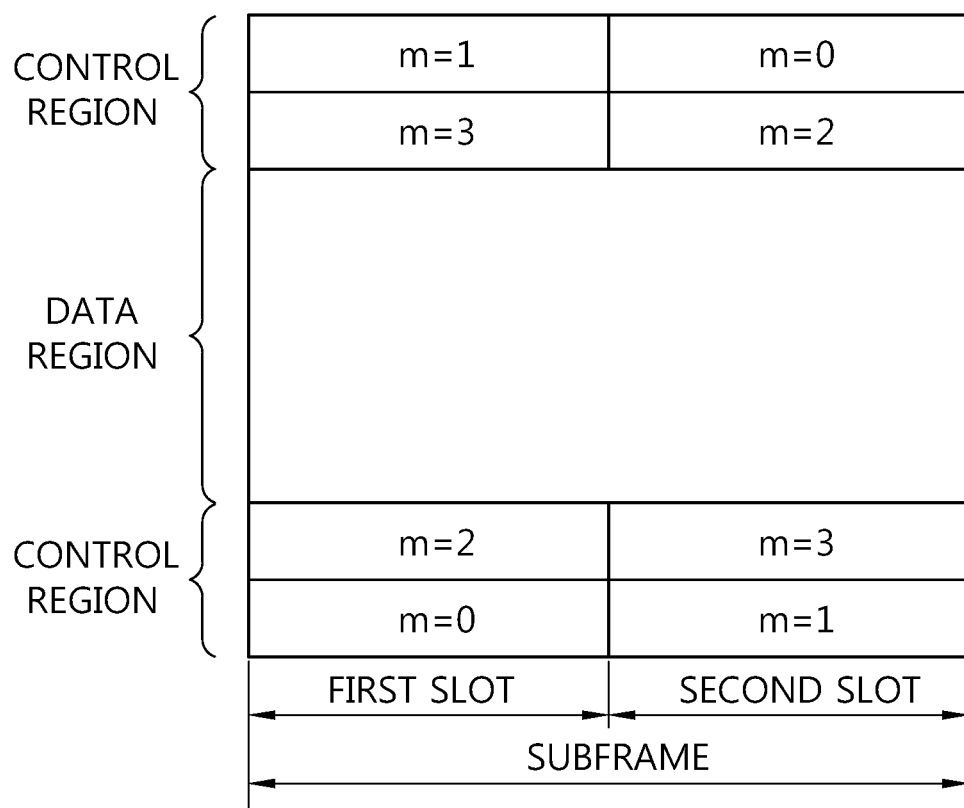
FIG. 6 illustrates the architecture of an uplink subframe in 3GPP LTE.
Figure 6:
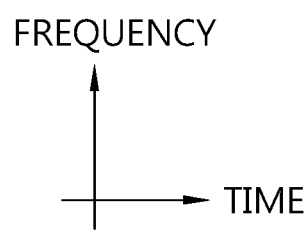

FIG. 6 shows a structure of an uplink subframe in 3GPP LTE.

Referring to FIG. 6, the uplink subframe can be divided into a control region and a data region. A physical uplink control channel (PUCCH) for carrying uplink control information is allocated to the control region. A physical uplink shared channel (PUSCH) for carrying data is allocated to the data region.

The PUCCH for one UE is allocated in an RB pair in a subframe. RBs belonging to the RB pair occupy different subcarriers in each of a first slot and a second slot. A frequency occupied by the RBs belonging to the RB pair to which the PUCCH is allocated changes at a slot boundary. This is called that the RB pair allocated to the PUCCH is frequency-hopped at the slot boundary.

Since the UE transmits the uplink control information on a time basis through different subcarriers, a frequency diversity gain can be obtained. m is a location index indicating a logical frequency domain location of a RB pair allocated to a PUCCH in a subframe.

Examples of the uplink control information transmitted on a PUCCH include hybrid automatic repeat request (HARQ), acknowledgement (ACK)/non-acknowledgement (NACK), channel quality indicator (CQI) indicating a DL channel state, scheduling request (SR) which is a UL radio resource allocation request, etc.

The PUSCH is mapped to an uplink shared channel (UL-SCH) which is a transport channel. Uplink data transmitted through the PUSCH may be a transport block which is a data block for the UL-SCH transmitted during a TTI. The transport block may be user information. In addition, the uplink data may be multiplexed data. The multiplexed data may be obtained by multiplexing the control information and a transport block for the UL-SCH.

Figure 7:
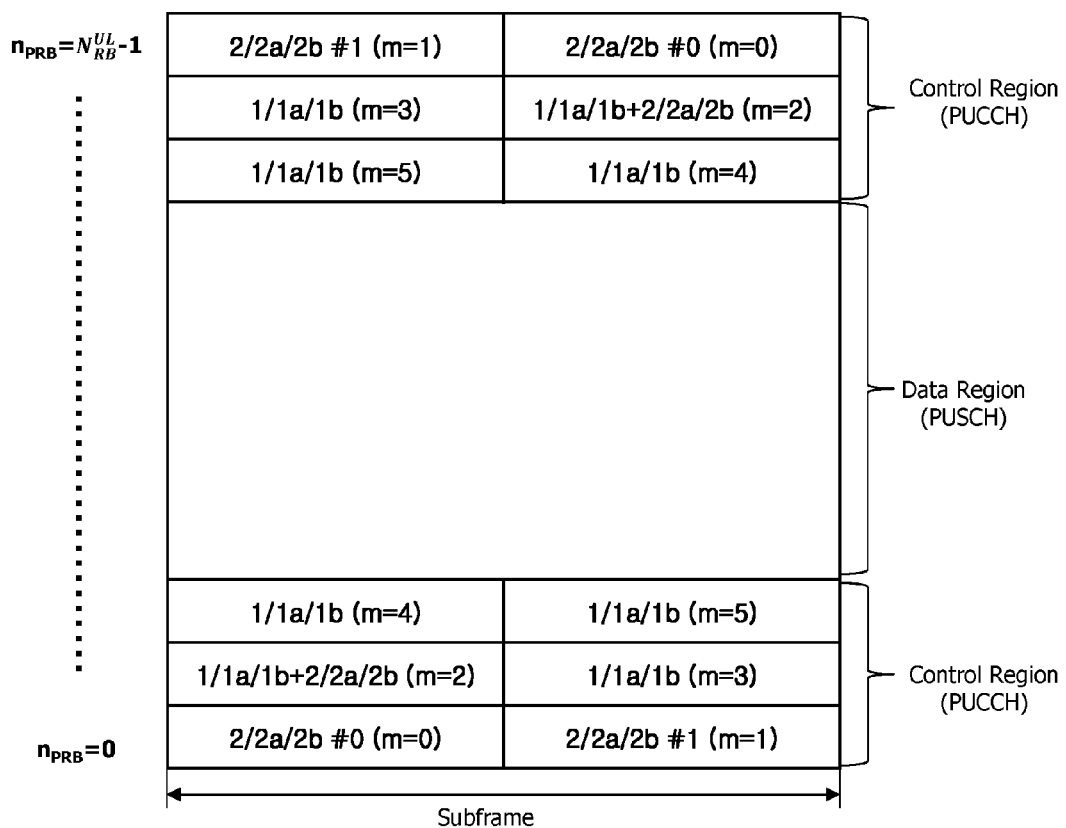
FIG. 7 illustrates a PUCCH and a PUSCH on an uplink subframe.

FIG. 7 illustrates a PUCCH and a PUSCH on an uplink subframe.

PUCCH formats will be described with reference to FIG. 7.

Uplink control information (UCI) may be transmitted to the PUCCH. In this case, the PUCCH transmits various types of control information according to a format. The UCI includes a HARQ ACK/NACK, a scheduling request (SR), and channel status information (CSI) representing a downlink channel status.

PUCCH format 1 transmits a scheduling request (SR). In this case, an on-off keying (OOK) scheme may be applied. PUCCH format 1a transmits an acknowledgement/non-acknowledgment (ACK/NACK) modulated by a binary phase shift keying (BPSK) scheme with respect to one codeword. PUCCH format 1b transmits an ACK/NACK modulated by a quadrature phase shift keying (QPSK) scheme with respect to two codewords. PUCCH format 2 transmits a channel quality indicator (CQI) modulated by the QPSK scheme. PUCCH formats 2a and 2b transport the CQI and the ACK/NACK.

Table 4 illustrates the PUCCH formats.

TABLE 4

| Format | Description |
|---|---|
| Format 1 | Scheduling request (SR) |
| Format 1a | ACK/NACK of 1 bit HARQ, Scheduling request (SR) may exist or not |
| Format 1b | ACK/NACK of 2 bit HARQ, Scheduling request (SR) may exist or not |
| Format 2 | CSI (20 code bits) |
| Format 2 | In the case of extended CP, CSI and HARQ ACK/NACK of 1 bit or 2 bits |
| Format 2a | CSI and HARQ ACK/NACK of 1 bit |
| Format 2b | CSI and HARQ ACK/NACK of 2 bits |
| Format 3 | A plurality of ACK/NACKs for carrier aggregation |

Each PUCCH format is mapped in the PUCCH to be transmitted. For example, the PUCCH formats 2/2a/2b are mapped in the resource block (m=0, 1 in FIG. 7) of a band edge allocated to the UE to be transmitted. A mixed PUCCH resource block (RB) may be mapped in a resource block (for example, m=2) adjacent to the resource block to which the PUCCH formats 2/2a/2b are allocated in a central direction of the band to be transmitted. The PUCCH formats 1/1a/1b to which the SR and the ACK/NACK are transmitted may be disposed in a resource block of m=4 or m=5. The number N(2)RB of resource blocks which may be used in the PUCCH formats 2/2a/2b to which the CQI is transmitted may be indicated to the UE through a broadcasted signal.

The aforementioned CSI is an index representing a status of the DL channel, and may include at least one of a channel quality indicator (CQI) and a precoding matrix indicator (PMI). Further, a precoding type indicator (PTI), a rank indication (RI), and the like may be included.

The CQI provides information on link adaptive parameters which may be supported by the UE for a predetermined time. The CQI may indicate a data rate which may be supported by the DL channel by considering a characteristic of the UE receiver, a signal to interference plus noise ratio (SINR), and the like. The base station may determine modulation (QPSK, 16-QAM, 64-QAM, and the like) to be applied to the DL channel and a coding rate by using the CQI. The CQI may be generated by various methods. For example, the various methods include a method of quantizing and feed-backing the channel status as it is, a method of calculating and feed-backing a signal to interference plus noise ratio (SINR), a method of notifying a status which is actually applied to the channel such as a modulation coding scheme (MCS), and the like. When the CQI is generated based on the MCS, the MCS includes a modulation scheme, a coding scheme, and a coding rate according to the coding scheme, and the like.

The PMI provides information on a precoding matrix in precoding based on a code book. The PMI is associated with the multiple input multiple output (MIMO). The feed-backing of the PMI in the MIMO may be called a closed loop MIMO.

The RI is information on the number of layers recommended by the UE. That is, the RI represents the number of independent streams used in spatial multiplexing. The RI is fed-back only in the case where the UE operates in an MIMO mode using the spatial multiplexing. The RI is always associated with one or more CQI feed-backs. That is, the fed-back CQI is calculated by assuming a predetermined RI value. Since the rank of the channel is generally changed slower than the CQI, the RI is fed-back less than the number of CQIs. A transmission period of the RI may be a multiple of the CQI/PMI transmission period. The RI is defined in the entire system band, and a frequency-selective RI feedback is not supported.

As such, the PUCCH is used only in the transmission of the UCI. To this end, the PUCCH support multiple formats. A PUCCH having different bit numbers for each subframe may be used according to a modulation scheme subordinate to the PUCCH format.

Meanwhile, the illustrated PUSCH is mapped in an uplink shared channel (UL-SCH) which is a transmission channel. Uplink data transmitted on the PUSCH may be a transmission block which is a data block for the UL-SCH transmitted during the TTI. The transmission block may include user data. Alternatively, the uplink data may be multiplexed data. The multiplexed data may be acquired by multiplexing the transmission block for the UL-SCH and the channel status information. For example, the channel status information (CSI) multiplexed in the data may include the CQI, the PMI, the RI, and the like. Alternatively, the uplink data may be constituted by only the uplink status information. Periodic or aperiodic channel status information may be transmitted through the PUSCH.

The PUSCH is allocated by the UL grant on the PDCCH. Although not illustrated, a fourth OFDM symbol of each slot of the normal CP is used in the transmission of a demodulation reference signal (DM RS) for the PUSCH.

A carrier aggregation system is now described.

Figure 8:
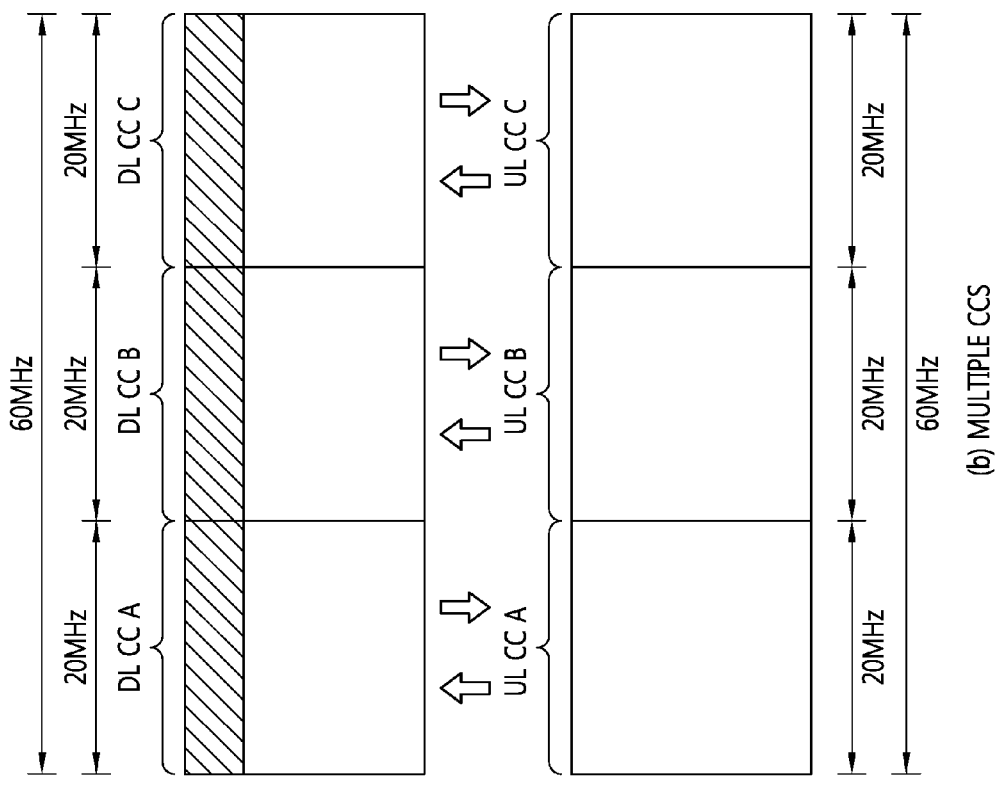
FIG. 8 illustrates an example of comparison between a single carrier system and a carrier aggregation system.
Figure 8:
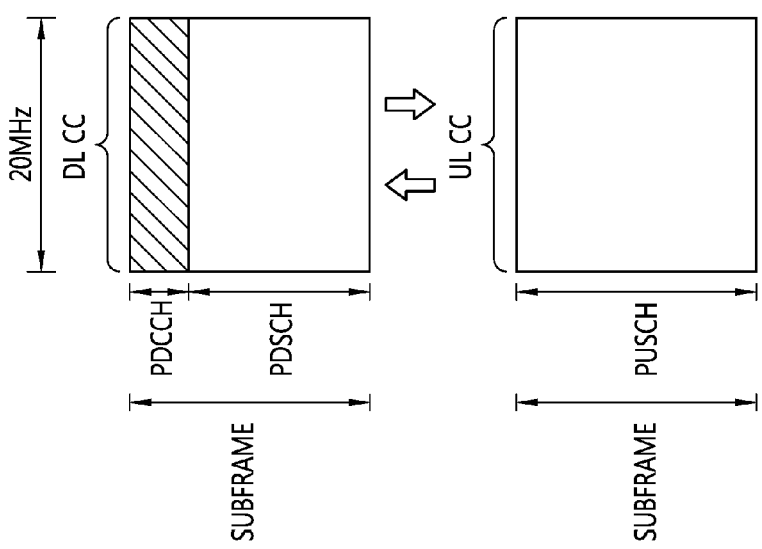

FIG. 8 illustrates an example of comparison between a single carrier system and a carrier aggregation system.

Referring to FIG. 8, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 9:
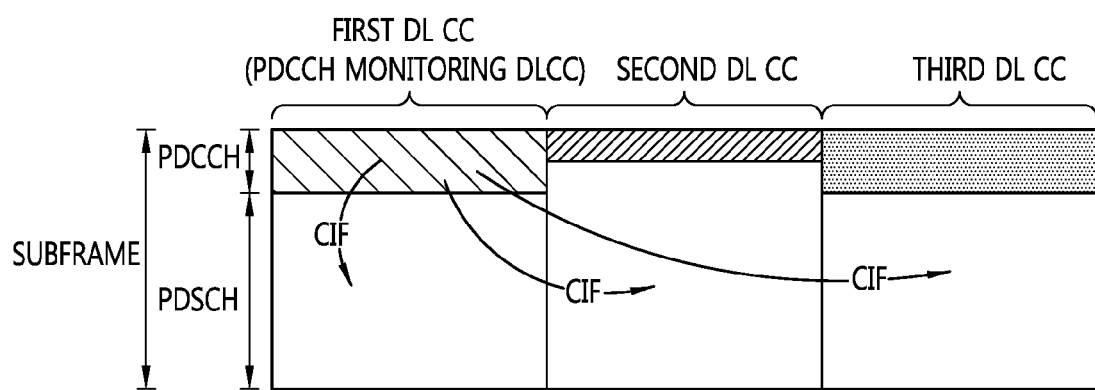
FIG. 9 exemplifies cross-carrier scheduling in a carrier aggregation system.

FIG. 9 exemplifies cross-carrier scheduling in the carrier aggregation system.

Referring to FIG. 9, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 9 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Hereinafter, HARQ in 3GPP LTE is described

<HARQ (Hybrid Automatic Repeat Request)>

In 3GPP LTE system, a synchronous HARQ is used for uplink transmission, and an asynchronous HARQ is used for downlink transmission. The synchronous HARQ is characterized that retransmission timing is fixed, and the asynchronous HARQ is characterized that retransmission timing is not fixed. That is, by using the synchronous HARQ, an initial transmission and the retransmission are performed in a HARQ cycle.

Figure 10:
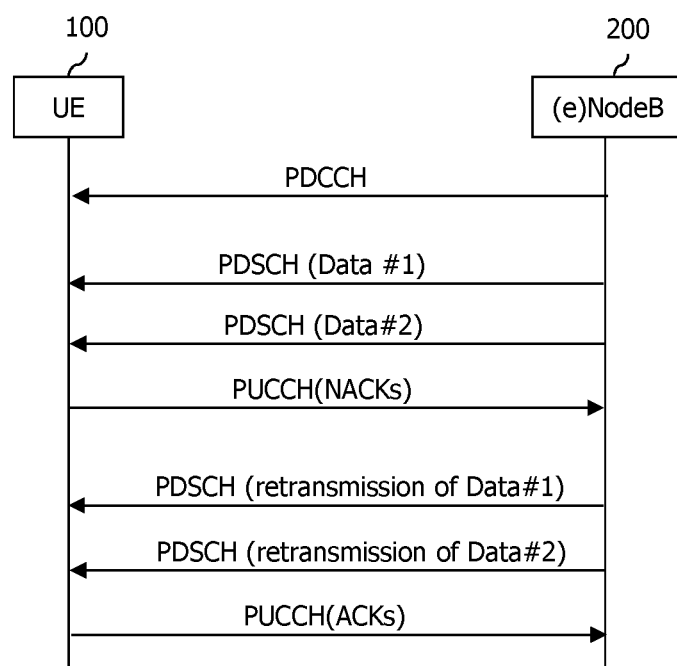
FIG. 10 exemplifies a HARQ operation between a BS and a UE.

FIG. 10 exemplifies a HARQ operation between a BS and a UE.

First, a BS, that is, an eNodeB 200 transmits scheduling information through the physical downlink control channel (PDCCH) control channel in order to transmit data to a terminal, that is, a UE 100 in the HARQ scheme.

The UE 100 checks the incoming scheduling information by monitoring the control channel, that is, the PDCCH.

When it is detected that there is incoming system information by checking the scheduling information, the UE 100 receives data #1 from the eNodeB 200 through the physical shared channel (PSCH) on the timing related to the PDCCH.

Similarly, the UE 100 receives data #2 from the eNodeB 200 according to the scheduling information of the PDCCH.

When receiving data, the UE 100 tries to decode the data. The UE transmits a HARQ feedback to the eNodeB 200 according to the result of decoding. That is, the UE 100 transmits ACK signal if decoding is successful, and transmits NACK signal if decoding is failed, to the eNodeB 200 through the PUCCH or the PUSCH.

When the eNodeB 200 receives the ACK signal, the eNodeB 200 detects that the data transmission is successful and transmits the next data.

However, when the eNodeB 200 receives the NACK signal, the eNodeB 200 detects that the data transmission is failed and retransmits the same data in the same form or a new form.

The UE 100 that receives the NACK signal receives the PDCCH, and tries to receive the data which is retransmitted from the eNodeB 200 according to the scheduling information of the PDCCH.

When receiving the retransmitted data, the UE 100 tries to decode the data again by combining with the data stored in a buffer as it is when failing of decoding in various ways, and transmits the ACK signal if decoding is successful and transmits the NACK signal if decoding is failed to the eNodeB 200 through the PUCCH or the PUSCH. The UE 100 repeat the process of transmitting the NACK signal and receives the retransmission until decoding of data is successful.

<Carrier Aggregation of an FDD-Based Cell and a TDD-Based Cell>

Meanwhile, as the spread of smart phones, users require faster data communications. As such, at the moment when high-speed data communications are required, it may be inefficient for a mobile carrier to provide an FDD-based service only or a TDD-based service only conventionally in the aspect of frequency use. As a result, it may be desirable to have a UE to access both to a cell that uses FDD and to a cell that uses TDD at the same time. In order to realize this, there is talk to combine an FDD-based cell and a TDD-based cell in carrier aggregation (CA) technology in the next generation mobile communication system.

Figure 11A:
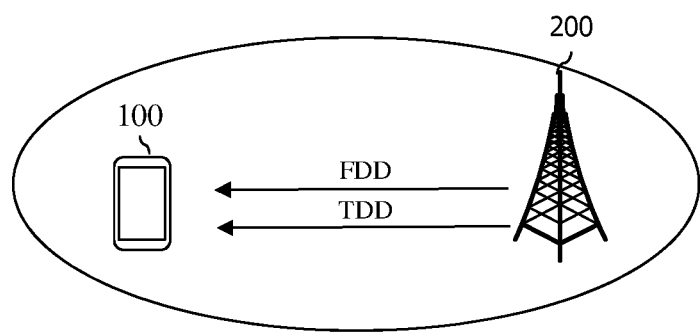
FIG. 11a and FIG. 11b illustrate an example of combining an FDD-based cell and a TDD-based cell according to the carrier aggregation (CA) technology which has been discussed as the next generation system.
Figure 11B:
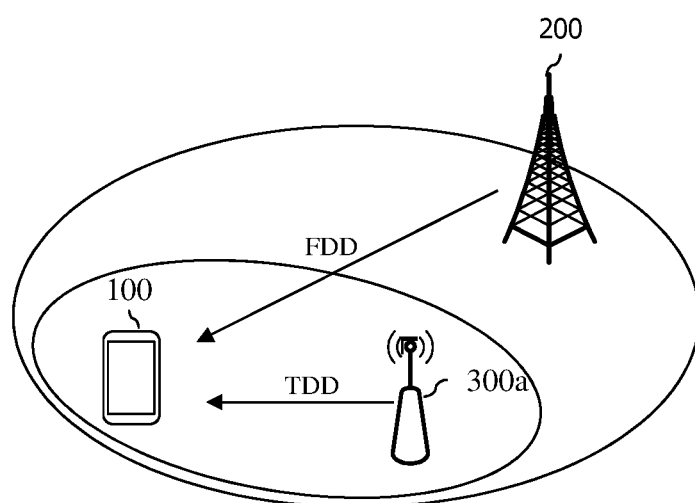

FIG. 11a and FIG. 11b illustrates an example of combining an FDD-based cell and a TDD-based cell according to the carrier aggregation (CA) technology which has been discussed as the next generation system.

First of all, as shown in FIG. 11a, a BS 200 may be improved to provide a FDD-based cell and a TDD-based cell respectively. Also, the BS 200 may combine the FDD-based cell and the TDD-based cell by using the carrier aggregation (CA) technology. Accordingly, a UE 100 may make use of both of the FDD-based cell and the TDD-based cell according to the carrier aggregation (CA) technology.

Meanwhile, as shown in FIG. 11b, within coverage of a BS 200, a small base station which has a small radius of cell coverage may be arranged. Since the BS 200 has coverage bigger than the small base station does, it may be referred to a macro BS. The cell that is provided by the macro BS may be referred to a macro cell. And the cell that is provided by the small base station may be referred to a small cell. The macro BS, as shown in the drawings, may provide an FDD-based cell, and the small BS, as shown in the drawings, may provide a TDD-based cell. The FDD-based cell of the macro BS and the TDD-based cell of the small BS may be combined by using the carrier aggregation (CA) technology.

However, in case that the FDD-based cell and the TDD-based cell are included in the carrier aggregation (CA) as described above, the HARQ operation of a UE 100 becomes problematic.

<Disclosures of the Present Specification>

Therefore, the disclosures of the present specification are to propose methods for a UE 100 to perform normally the HARQ operation when an FDD-based cell and a TDD-based cell are included in the carrier aggregation (CA).

I. A First Disclosure of the Present Specification

First, in 3GPP release 11, a UE may transmit and receive data from a plurality of cells that have an identical frame structure type (e.g., FDD or TDD). However, as described above, in the next system, for flexible management and operation of frequency bands, the environment in which data/control information of a plurality of cells that uses different frame structure types with each other is transmitted and received by one UE may be considered. That is, an FDD-based cell and a TDD-based cell may be included in the carrier aggregation and may be provided to a UE. Hereinafter, the carrier aggregation of the FDD-based cell and the TDD-based cell is referred to as 'TDD-FDD CA'.

In the TDD-FDD CA, an uplink (UL) and a downlink (DL) are coexisted in a TDD cell according to the uplink-downlink (UL-DL) configuration as shown in Table 1. On the other hand, an uplink (UL) and a downlink (DL) are always existed in a FDD cell. When the conventional TDD timing is applied in an FDD cell, there are existed the subframes in which a scheduling method is not configured in an FDD cell. For example, when a TDD UL-DL configuration is 1, and the TDD UL-DL configuration of 1 is applied to an FDD cell as well, in case of a downlink (DL) HARQ-ACK, for the subframe corresponding to an uplink in a TDD cell, any scheduling method or a method for transmitting HARQ-ACK are not configured even though a downlink (DL) exists in an FDD. If the scheduling is not performed for a downlink (DL) subframe, like the conventional TDD method, in case that a standard UL-DL configuration is 5, a maximum number of cells included in the carrier aggregation may be limited to 2, and for the remaining cases, it may be permitted by 5.

According to an embodiment of the present specification, in order to increase the flexibility in the operation of resources, that is, in order to make use of a downlink (DL) subframe of the FDD cell, an additional timing may be designated according to a number of methods. For example, according to a first method, a UE may transmit a HARQ-ACK in an uplink (UL) subframe that is the fastest available in 4 ms after receiving PDSCH. Or according to a second method, in order to prevent the deterioration of performance which may be occurred in case that a HARQ-ACK bit is congested in a specific subframe when transmitting the HARQ-ACK, an additional HARQ-ACK timing may be distributed into several subframes. According to a third method, the transmission time of the HARQ-ACK for a PDSCH may not be ahead of the transmission time of the HARQ-ACK for the PDSCH which corresponds to the previous time of the corresponding PDSCH. Hereinafter, the table shows an example of the HARQ transmission timing.

TABLE 5

| UL-DL configuration | HARQ ACK/NACK transmission subframe n | | | | | | | | |
|---|---|---|---|---|---|---|---|---|---|
| | 0 | 1 | 2 | 3 | 4 | 5 | 6 | 7 | 8 | 9 |
| 0 (A first method) | — | — | 6, [5] | [5], [4] | 4 | — | — | 6, [5] | [5], [4] | 4 |
| 0 (Transform of the first method) | | | 6, [5], [4] | | [5], 4 | | | 6, [5], [4] | | [5], 4 |
| 1 | — | — | 7, 6, [5] | [5], 4 | — | — | — | 7, 6, [5] | [5], 4 | — |
| 2 | — | — | 8, 7, 6, [5], 4 | — | — | — | — | 8, 7, 6, [5], 4 | — | — |
| 3 (A first method) | | | 11, [10], [9], [8], 7, 6 | 6, 5 | 5, 4 | | | | | |

TABLE 5-continued

| UL-DL configuration | HARQ ACK/NACK transmission subframe n | | | | | | | | |
|---|---|---|---|---|---|---|---|---|---|
| | 0 | 1 | 2 | 3 | 4 | 5 | 6 | 7 | 8 | 9 |
| 3 (A second method) | — | — | 11, [10], 7, 6 | [10], 6, 5 | [10], 5, 4 | | | | | |
| 3 (A third method) | — | — | 11, [10], [9], [8], 7, 6 | 6, 5 | 5, 4 | | | | — | — |
| 4 (A first method) | | | 12, 11, [10], [9], 8, 7 | 7, 6, 5, 4 | | | | | | |
| 4 (A second method) | — | — | 12, 11, [10], 8, 7 | [10], 7, 6, 5, 4 | — | | | | — | — |
| 4 (A third method) | — | — | 12, 11, [10], [9], 8, 7 | 7, 6, 5, 4 | | | | | — | — |
| 5 | — | — | 13, 12, 11, [10], 9, 8, 7, 6, 5, 4 | — | — | | | | — | — |
| 6 (A first method) | | | 7, [5], [4] | 7 | 5 | — | — | 7, [5], [4] | 7, [4] | |
| 6 (A second method) | | | [8], 7 | 7, [6] | [6], 5 | — | — | 7, [5] | 7, [5] | |
| 6 (A third method) | — | — | [8], 7 | 7, [6] | [6], 5 | — | — | 7 | 7, [6], [5] | — |

A square bracket [ ] in the above table is the number of a PDSCH receiving subframe K which is newly added according to the respective method.

A square bracket [ ] in the above table is the number of a PDSCH receiving subframe K which is newly added according to the respective method.

If making use of an additional FDD DL subframe according to the first method and the second method among the methods described above, the bit of the HARQ ACK/NACK that is able to be transmitted at once on an uplink subframe n may be exceeded.

Accordingly, it is required to limit the maximum number that is for aggregation. The limitation as such may be applied to the case that a UE which performs the TDD-FDD CA follows the TDD timing when transmitting the HARQ-ACK. In addition, the limitation may be applied to the case that a TDD-based cell is a primary cell of carrier aggregation and a FDD-based cell is a secondary cell of carrier aggregation. And the DL HARQ-ACK timing of an FDD-based cell for the subframe that corresponds to the DL in a TDD-based cell may basically follow the UL-DL configuration of a TDD-based primary cell. Meanwhile, the subframe which does not correspond to the TDD UL-DL configuration configured among the DL subframes of the FDD cell may be referred to a remaining DL subframe.

Hereinafter, a method is described for limiting the maximum number of cells that are available for aggregation.

II. A Second Disclosure of the Present Specification: Limitation of the Maximum Number of Cells that are Available for Aggregation The maximum number of the cells that are object of carrier aggregation depends on whether a plurality of HARQ-ACK is available to be transmitted. For example, in case that PUCCH format 3 is supported, maximum 20 bits of the HARQ-ACK is allowable, and the maximum number of the cells that are object of carrier aggregation may be configured based on the standard that the corresponding HARQ-ACK bit number does not exceed 20 bits.

The following is a detailed example of a method for configuring a maximum number of cells which are available for aggregation according to the TDD UL-DL configuration. The TDD UL-DL configuration may be a configuration that corresponds to a TDD cell in the TDD-FDD CA, or a UL-DL configuration that an FDD cell refers as a DL HARQ-ACK timing. In the embodiment of the present invention, although the maximum number of cells that are able to be aggregated is described for the TDD cells that configure the carrier aggregation (CA), a method for configuring a number of FDD cells that configure the carrier aggregation (CA) may also be extended from the present invention.

(1) TDD UL-DL Configuration 0

This may be described as a case that the maximum value of a DL subframe number M that corresponds to a single UL subframe is 1. According to the corresponding UL-DL configuration, one radio frame includes 6 ULs, and accordingly, the remaining DL subframe number of an FDD cell is 6 as well. Therefore, the maximum number of cells that are able to be aggregated, regardless of the HARQ-ACK timing configuration of the remaining DL subframe, may be determined to be 5.

(2) TDD UL-DL Configuration 1

This may be described as a case that the maximum value of a DL subframe number M that corresponds to a single UL subframe is 2. According to the corresponding UL-DL configuration, one radio frame includes 4 ULs, and accordingly, the remaining DL subframe number of an FDD cell is 4 as well. The maximum number of cells that are able to be aggregated, regardless of the HARQ-ACK timing configuration of the remaining DL subframe, may be determined to be 5.

(3) TDD UL-DL Configuration 2

This may be described as a case that the maximum value of a DL subframe number M that corresponds to a single UL subframe is 4. According to the corresponding UL-DL configuration, one radio frame includes 2 ULs, and accordingly, the remaining DL subframe number of an FDD cell is 4 as well. In the corresponding UL-DL configuration, in case that the remaining DL subframes of FDD are not used, the number of the HARQ-ACK bit (including using spatial bundling) is maximum 20 bits based on that 5 cells are aggregated. Accordingly, in case that the remaining DL subframes of FDD are used, the maximum number of cells that are able to be aggregated should be configured less than 5. In the relevant UL-DL configuration, since the UL-DL switching periodicity is 5 ms and the number of UL subframe per 5 ms is 1, there is no difference in the first method, the second method, and the third method described with reference to Table 5 above. Therefore, in case that the remaining DL subframes of FDD are used, the maximum number of cells that are able to be aggregated may be determined to be 4. More specifically, for the case that the number of bits for the information of a PUCCH format 3 is extended to 22 bits, if the number of an FDD cell that is included in CA is 1, the maximum number of cells that are able to be aggregated may be configured by being extended to 5.

(4) TDD UL-DL Configuration 3

This may be described as a case that the maximum value of a DL subframe number M that corresponds to a single UL subframe is 3. According to the corresponding UL-DL configuration, one radio frame includes 3 ULs, and accordingly, the remaining DL subframe number of an FDD cell is 3 as well. In case of making use of the remaining DL subframes of FDD according to the second method that is described with reference to Table 5 above, the maximum number of cells that are able to be aggregated may be configured to 5. However, in case of making use of the remaining DL subframes of FDD according to the first method that is described with reference to Table 5 above, the maximum number of cells that are able to be aggregated may be configured according to the next example. Herein, since the first method aforementioned is identical to the third method in HARQ timing, the same applies to the third method as well.

According to a first example, the maximum number of cells that are able to be aggregated is fixed to 4 for convenience sake. In this case, the number of information bit for PUCCH format 3 may be limited to the case of total 22 bits being allowed. In case that the number of information bit for PUCCH format 3 is limited to the case of total 21 bits being allowed, the maximum number of cells that are able to be aggregated is fixed to 3.

According to a second example, the allowable maximum number of cells that are able to be aggregated depends on the combination of the number of TDD cells and the number of FDD cells that are included in CA. By two of TDD cells, the maximum number of cells that are able to be aggregated is configured to 4, and the rest are allowed by 5 cells. In the second example, the information bit of PUCCH format 3 may correspond to a total of 22 bits. In case that the number of information bit for PUCCH format 3 is limited to a total of 21 while the TDD cell is 1, the maximum number of cells that are able to be aggregated is configured to 3. And if there are two or three TDD cells, the maximum number of cells that are able to be aggregated is configured to 4 and 5 cells that are allowable for the rest.

According to a third example, considering different configurations of the TDD UL-DL among TDD cells, when the number of TDD cells that are included in CA is more than two, it may be assumed that the value M for the TDD cells is 4. Here, it may be excluded in case that the standard UL-DL configuration between TDD cells is 5. According to the third example, the allowable maximum number of cells that are able to be aggregated may be decided depending on the combination of the number of TDD cells and the number of FDD cells that are included in CA. In case that there are four TDD cells, the maximum number of cells that are able to be aggregated is configured to 5, and the rest are allowed by 4 cells. In the second example, the information bit of PUCCH format 3 may correspond to a total of 22 bits. In case that the number of information bit for PUCCH format 3 is limited to a total of 21 while the TDD cell is one, the maximum number of cells that are able to be aggregated is configured to 3 and the rest is allowed by 4 cells.

(5) TDD UL-DL Configuration 4

This may be described as a case that the maximum value of a DL subframe number M that corresponds to a single UL subframe is 4. According to the corresponding UL-DL configuration, one radio frame includes 2 ULs, and accordingly the remaining DL subframe number of an FDD cell is 2 as well. In case of making use of the remaining DL subframes of FDD according to the second method that is described with reference to Table 5 above, the maximum number of cells that are able to be aggregated may be configured to 4. More specifically, for the above second method, for the number of bits for the information of PUCCH format 3 is extended to 22 bits, if the number of a TDD cell that is included in CA is 1, the maximum number of cells that are able to be aggregated may be configured by being extended to 5. However, in case of making use of the remaining DL subframes of FDD according to the first method that is described with reference to Table 5 above, the maximum number of cells that are able to be aggregated may be configured according to the next example. Herein, since the first method aforementioned is identical with the third method in HARQ timing, the same applies to the third method as well.

According to a first example, the maximum number of cells that are able to be aggregated is fixed to 4 for convenience sake.

According to a second example, the allowable maximum number of cells that are able to be aggregated may decided depending on the combination of the number of TDD cells and the number of FDD cells that are included in CA. By one TDD cell, the maximum number of cells that are able to be aggregated is configured to 3, and the rest are allowed by 5 cells.

According to the third example, the maximum number of cells that are able to be aggregated may be fixed to 4. This may be limited to a case that the information bit of PUCCH format 3 is allowed to a total of 22 bits. In case that the cells that are able to be aggregated are 4, the number of HARQ-ACK is maximum 22 bits, and only for the subframe of which SR is not configured, the HARQ-ACK may be all transmitted. In this example, it may be assumed that a part of HARQ-ACKs are not transmitted for the subframe of which SR is configured, and the PDSCH is not scheduled in the relevant DL subframe. The above relevant DL subframe may be limited to the whole or a part of the remaining DL subframe of FDD cells. The limitation for scheduling may be applied to the CA that includes one TDD cell and three FDD cells.

(6) TDD UL-DL Configuration 5

This may be described as a case that the maximum value of a DL subframe number M that corresponds to a single UL subframe is 5. According to the corresponding UL-DL configuration, one radio frame includes 1 UL, and accordingly the remaining DL subframe number of an FDD cell is 1 as well. Regardless of the configuration of the HARQ-ACK timing of the remaining DL subframe, the maximum number of cells that are able to be aggregated may be configured to 2. The reason is that a UL subframe is 1 and the configuration method of the remaining DL subframe is 1, and in this case, the number of HARQ-ACK bit per each cell (if required, spatial bundling is applied) is configured to 10 bits, and in case that 2 cell are aggregated, the total number of HARQ-ACK is configured to 20 bits.

(7) TDD UL-DL Configuration 6

This may be described as a case that the maximum value of a DL subframe number M that corresponds to a single UL subframe is 1. According to the corresponding UL-DL configuration, one radio frame may include 5 ULs, and accordingly the remaining DL subframe number of an FDD cell is 5 as well. Regardless of the configuration of the HARQ-ACK timing of the remaining DL subframe, the maximum number of cells that are able to be aggregated is configured to 5.

The following additional examples may be considered when the maximum number of cells that are able to be aggregated is configured or limited for TDD cells and FDD cells being aggregated.

According to a first example, when TDD cells and FDD cells are included in CA, the maximum number of cells aggregated, regardless of the TDD UL-DL configuration, may be limited to 2. The TDD-FDD CA may follow TDD HARQ timing.

According to a second example, when TDD cells and FDD cells are included in CA, for the TDD UL-DL configuration which is not available for the maximum number of cells aggregated to be configured to 5, the maximum number of cells aggregated is limited to 2. And, the TDD-FDD CA may be limited to following the TDD HARQ timing. More specifically, the corresponding TDD UL-DL configuration may be limited to 2, 3, 4, and 5. In TDD UL-DL configuration 3, in case that the remaining DL subframes of an FDD cell are supported in a method 2 described with reference to Table 5 above, the UL-DL configuration which does not support 5 cells described above may be excluded. According to this, it may be allowable that the maximum number of cells aggregated is 5 only in case that the maximum value of M that includes the remaining DL subframes of FDD is less than 4.

Meanwhile, the descriptions described so far are summarized with reference to FIG. 12 as below.

Figure 12:
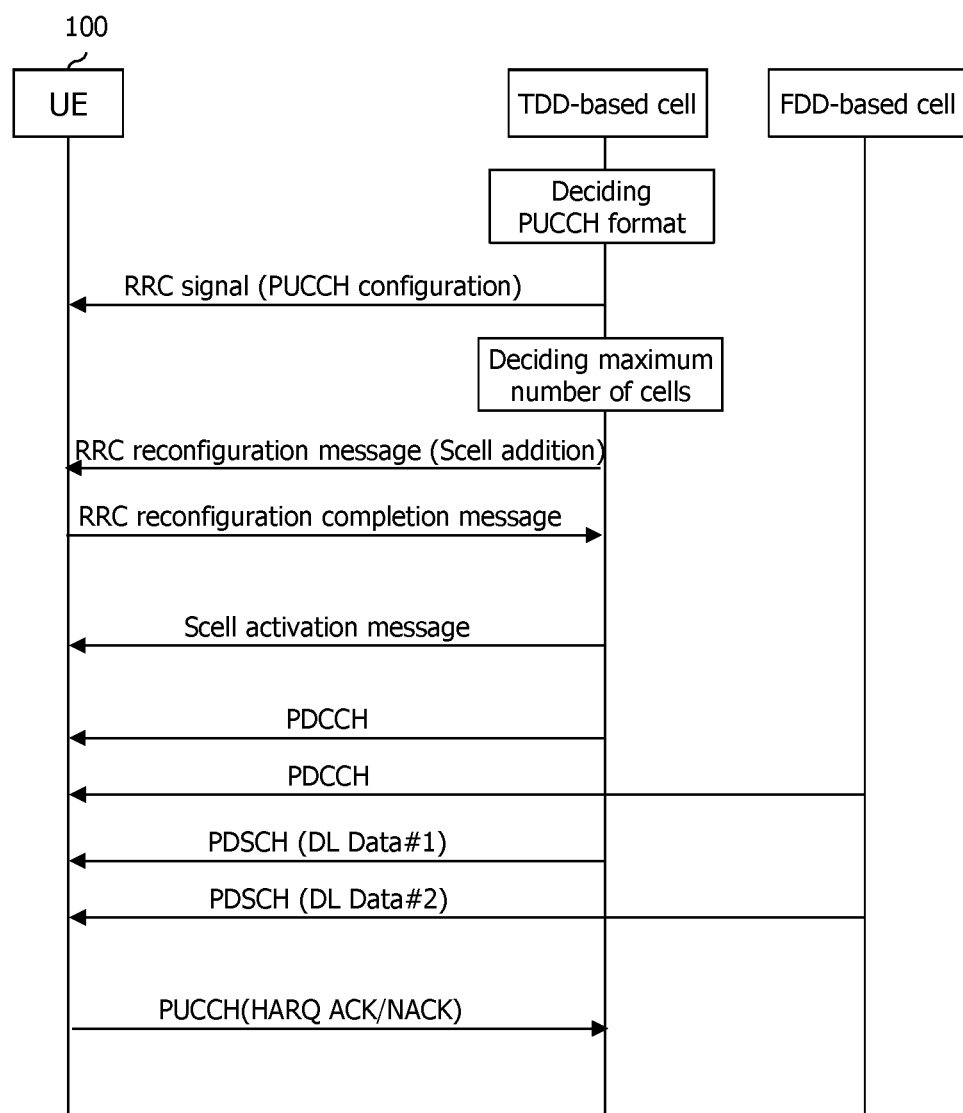
FIG. 12 is a flowchart illustrating a method according to a second disclosure of the present specification.

FIG. 12 is a flowchart illustrating a method according to a second disclosure of the present specification.

Referring to FIG. 12, a TDD-based cell is a primary cell of the carrier aggregation, and an FDD-based cell is a secondary cell of the carrier aggregation.

First, the TDD-based cell that corresponds to a primary cell determines a PUCCH format of a UE 100, and forwards the PUCCH configuration including the information of the PUCCH format determined above through RRC signal to the UE 100.

Then, the TDD-based cell that corresponds to the primary cell determines the maximum number of cells that are available to be included in carrier aggregation. For example, in case that PUCCH format 3 is decided as a PUCCH format of the UE 100 from the above step, the maximum number of the cell may be decided not to exceed 20 bits of the HARQ-ACK/NACK which is transmitted by a UE.

Subsequently, the TDD-based cell forwards an RRC reconfiguration message in order to add a secondary cell within a range of the maximum number of the determined cells. Here, the secondary cell added may include an FDD-based cell.

The UE 100 transmits an RRC reconfiguration completion message to the TDD-based cell in response to the RRC reconfiguration message.

Next, the TDD-based cell transmits an activation message to the UE 100 in order to activate the secondary cell.

Meanwhile, each cell transmits a PDCCH that includes scheduling information, and subsequently, transmits a PDSCH that includes DL data to the UE 100.

If the UE 100 receives the DL data, the UE 100 should transmit the HARQ-ACK/NACK in response to each of the DL data.

At the moment, in case that the configured PUCCH format is PUCCH format 3, the UE 100 decides a bit number of HARQ-ACK/NACK which is transmitted from UL subframe n. In case that a DL-reference UL-DL configuration of the TDD-based cell corresponds to one of 2, 3, 4, and 5, the UE 100 may assume that the number of cell included in carrier aggregation is limited not to exceed 20 bits of the HARQ-ACK/NACK.

III. A Method for the Maximum 5 Cells to be Aggregated

When deciding the bit of HARQ-ACK/NACK to be transmitted, as described above, a method may be taken that all of the available subframes are thoroughly used for each cell and the number of cells which are object of carrier aggregation (CA) is limited, on the contrary, that the maximum number of cells that are object of CA is fixed to 5 and utilizes a part the remaining DL subframes of FDD cell according to the limit that is able to be transmitted through PUCCH resources. Otherwise, a method of transmitting after decreasing the number of bit through HARQ-ACK bundling may be considered.

(1) Method of Using DL Subframe of FDD Cell Aligned with UL Subframe of TDD

When the maximum number of cells that are able to be aggregated is also maintained to be 5 for the TDD-FDD CA, the scheduling of remaining DL subframes of FDD cell is required to be limited as a whole or a part. The following is a detailed example of a method of configuring and selecting the use amount the remaining DL subframes of FDD.

For a first example, in case of following a TDD HARQ timing in the TDD-FDD CA, it is configured whether to use a whole or a part of the remaining DL subframes of FDD cell in order for the number of DL subframes which are connected to each UL subframe not to exceed 4. Here, the DL subframe that is connected to UL subframe may be interpreted as a DL subframe that corresponds to the relevant HARQ-ACK when a plurality of HARQ-ACKs is transmitted in a UL subframe in a TDD system. As an example, assuming that a TDD cell and a FDD cell that are configured in UL-DL configuration 3 are combined in CA and follow a TDD DL HARQ timing, the maximum value of the number of DL subframes which are connected to a single UL subframe (hereinafter, denoted by M) does not exceed 4 due to distributed mapping in case of the second method described with reference to Table 5 above. In case of the first method and the third method described with reference to Table 5 above, the maximum value of M may be 6, however, the maximum value of M is able to be set 4 by using only one remaining DL subframe among three remaining DL subframes according to the method. Here, in case that the number of HARQ-ACK bit is over 20, it may be represented that a whole or a part of the remaining DL subframes of FDD cell are not used.

As a second example, in the TDD-FDD CA, it may be configured whether a whole or a part of the remaining DL subframes of FDD cell are used according to the number of cells that are included by the CA. As a more specific example, in case of UL-DL configuration 2, all of the remaining DL subframes of FDD cell are permitted to be used by less than 4 of the number of cells that are included in CA but not permitted for 5 cells. In UL-DL configuration 3, in case of the first method and the third method described with reference to Table 5 above, all of the remaining DL subframes of FDD cell are permitted to be used by 4 of the number of cells that are included in CA but not permitted for 5 cells. In UL-DL configuration 4, in case of the first method and the third method described with reference to Table 5 above, all of the remaining DL subframes of FDD cell are permitted to be used by less than 3 of the number of cells that are included in CA but not permitted for 4 or 5 cells. In UL-DL configuration 4, in case of the second method described with reference to Table 5 above, all of the remaining DL subframes of FDD cell are permitted to be used by less than 4 of the number of cells that are included in CA but not permitted for 5 cells. In case that the number of HARQ-ACK bit is over 20, it may be represented that a whole or a part of the remaining DL subframes of FDD cell are not used.

Here, it may be configured by a higher layer whether a whole or a part of the remaining DL subframes of FDD cell are used. The configuration method at the moment may be designated for each DL subframe.

Meanwhile, as a more detailed example, for TDD UL-DL configurations 2, 3, and 4, it may be considered for HARQ timing to be (re-)configured in order not to occur the case of M>4. More specifically, in TDD UL-DL configuration 3, the HARQ timing may not be the second method described referring to Table 5 above.

As a modification of the first example, the corresponding UL-DL configuration may be followed in the timing of the conventional TDD primary cell. In the above description, the primary cell timing may be configured through SIB, or may be a real reference timing that is used in a primary cell. For example, in case that a TDD primary cell is operating on UL-DL configuration 4, the HARQ timing of FDD secondary cell in CA with the corresponding cell is considered to follow UL-DL configuration 4. In this case, additional timing may be allocated under M<=4. For example, when using UL-DL configuration 4, in case that the HARQ ACK/NACK transmission subframe n is 2 in the first method described referring to Table 5 above, the DL subframe k may permit either 10 or 9.

As another modification of the first example, the corresponding UL-DL configuration is to follow one of TDD UL-DL configurations 0 to 6. More specifically, in case that an FDD cell is a secondary cell, the DL HARQ timing may be configured to UL-DL configuration 5, or in case of UL-DL configuration 2, the DL HARQ timing may be configured to configuration 2 timing.

In this case, it may be considered that the HARQ timing is decided by different configurations according to the number of cells that construct CA. For example, it may be considered that the timing according to configuration 5 is used when the total number of cells that are object of CA is 2, and the timing according to configuration 2 is used when the number of cells that are object of CA is over 2. Here, the case of using the timing according to configuration 2 may correspond to a case that a TDD cell is a primary cell and the timing of the corresponding TDD cell is configuration 2. In this case, when the TDD cell is a primary cell, the timing of the primary cell may be configured through SIB or may be an actual reference timing that is used in the primary cell.

At this moment, the timing according to configuration 2 or the timing according to configuration 5 may be the existing timing or the timing that is shown in Table 5 above.

(2) A Method for Configuration of HARQ-ACK/NACK Bit when Transmitting Through PUCCH Format 1b which is Available to Select a Channel In case that the number of cells that construct the TDD-FDD CA is two, it may be considered to utilize PUCCH format 1b that is available for channel selection when a plurality of HARQ-ACK/NACKs is transmitted. However, in the conventional 3GPP Rel-11 system, the method of PUCCH format 1b that is available for channel selection is described for a case that the number (denoted by M) of DL subframes connected to the UL subframe to which the corresponding PUCCH is transmitted is maximum four and so it is required for a method that supports the case that the value M is 5 (and 6) in case that the additional bit of FDD cell in the TDD-FDD CA is used.

1) A Method for Designing New Table

A DAI-based method such as M=3 or 4 may be considered for a table design of PUCCH format 1b which is available to select a channel for a case of M=5 or 6. In case that a TDD cell is a primary cell, the HARQ-ACK may be transmitted through PUCCH format 1b which is available to select a channel for a case that the value of M (hereinafter, denoted by M_P) is maximum 4 and so a case may be considered that a value M_P cell and a value of M_S cell (M of S cell) are different in case that a TDD-based cell is a primary cell and an FDD-based cell is a secondary cell. For example, a case may be considered that the M_P cell is 4 and M_S cell is 5. Otherwise, by configuring the Max value of M_P cell and M_S cell as the final value M, the table of PUCCH format 1b that is available for channel selection may be selected. As an example, a case may be considered that M_P cell=M_S cell=5. A more detailed description is as follows.

As a first example, for the TDD-FDD CA only, a value of M_P cell and a value of M_S cell are independent each other, and by using this, the HARQ-ACK bit for PUCCH format 1b that is available for channel selection is configured.

As a second example, for the TDD-FDD CA only, by using the Max value of a value of M_P cell and a value of M_S cell, the HARQ-ACK bit for the PUCCH format 1b that is available for channel selection is configured.

As a third example, in the TDD-FDD CA, in case that the value of M_S cell is 5, the method of the first example is applied and in case that the value of M_S cell is less than 4, the second example is applied.

As a fourth example, in the TDD-FDD CA, a UE receives the value of M_S cell for the secondary cell that corresponds to an FDD-based cell through a higher layer signal. In this case, additionally scheduling restriction may be considered.

In the above example, the HARQ-ACK transmission may be considered to be performed by each cell, and by considering a sequence of ACK counters, the number of HARQ-ACK bit may be considered to be decreased by 2 bits per cell. Here, 2 bits may be expressed as the transformation HARQ-ACK of {(Ack, Ack), (Ack, Nack/DTX), (Nack/DTX, Ack), (Nack/DTX, Nack/DTX), (DTX, Nack/DTX)}. Later, the PUCCH resource and transport symbol may be configured according to a method shown the below table by inputting the transformation HARQ-ACK of 4 bits for 2 cells. The following table illustrates a HARQ-ACK multiplexing transmission for A=4.

TABLE 6

| Transformation HARQ-ACK Status: HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | | |

In the above table, the HARQ-ACK(0) and the HARQ-ACK(1) are transformation HARQ-ACKs for a primary cell, and the HARQ-ACK(2) and the HARQ-ACK(3) are transformation HARQ-ACKs for a secondary cell.

The following is a detailed example of a method of HARQ-ACK compressive transformation for M=5. As a detailed example, HARQ-ACK(k) is a HARQ-ACK that corresponds to a subframe including PDCCH/EPDCCH that represents a PDSCH transmission scheduled by $k^{th}$ order or DL semi persistent scheduling (SPS) release, each of DAI value may be configured as ((k−1) mod 4+1).

As a first example, it may be that a DL subframe (hereinafter, a remaining DL subframe) of an FDD cell which is associated with a TDD UL subframe corresponds to HARQ-ACK(4). And it is assumed that the remaining DL subframe is designed to increase peak data transmission rate. A HARQ-ACK transformation method may be according to Table 7 below. Table 7 below represents an example of a HARQ-ACK compressive transformation method for M=5.

TABLE 7

| HARQ-ACK(0), HARQ-ACK(1), HARQ-ACK(2), HARQ-ACK(3), HARQ-ACK(4) | Transformation HARQ-ACK state when A = 4 |
|---|---|
| (ACK, ACK, ACK, NACK/DTX, any) | ACK, ACK |
| (ACK, ACK, NACK/DTX, any, any) | NACK/DTX, ACK |
| (ACK, DTX, DTX, DTX, any) or (ACK, ACK, ACK, ACK, ACK) | ACK, NACK/DTX |
| (ACK, ACK, ACK, ACK, NACK/DTX), (ACK, NACK/DTX, any, any, any) except for (ACK, DTX, DTX, DTX, DTX), or (NACK, any, any, any, any) | NACK, NACK/DTX |
| (DTX, any, any, any, any) | DTX, NACK/DTX |

As a second example, a table is designed to increase data transmission rate for M=5. Table 8 below is a detailed example for this, and represents an example of HARK-ACK compressive transformation for M=5.

TABLE 8

| HARQ-ACK(0), HARQ-ACK(1), HARQ-ACK(2), HARQ-ACK(3), HARQ-ACK(4) | Transformation HARQ-ACK state when A = 4 |
|---|---|
| (ACK, ACK, ACK, ACK, NACK/DTX) | ACK, ACK |
| (ACK, ACK, ACK, NACK/DTX, any) | NACK/DTX, ACK |
| (ACK, DTX, DTX, DTX, any) or (ACK, ACK, ACK, ACK, ACK) | ACK, NACK/DTX |
| (ACK, ACK, NACK/DTX, any, any), (ACK, NACK/DTX, any, any, any) except for (ACK, DTX, DTX, DTX, DTX), or (NACK, any, any, any, any) | NACK, NACK/DTX |
| (DTX, any, any, any, any) | DTX, NACK/DTX |

In the above transformation HARQ-ACK state, (ACK, ACK) may be configured as (NACK/DTX, NACK/DTX), and the opposite case may also be considered. And (ACK, NACK/DTX) may be configured as (NACK/DTX, ACK), and the opposite case may also be considered. In case of secondary cell, in the transformation HARQ-ACK state, (NACK, NACK/DTX) and (DTX, NACK/DTX) may be considered to be (NACK/DTX, NACK/DTX).

As a third example, a table is designed to decrease data transmission rate for M=5. Table 9 below is a detailed example for this, and represents an example of HARK-ACK compressive transformation for M=5.

TABLE 9

| HARQ-ACK(0), HARQ-ACK(1), HARQ-ACK(2), HARQ-ACK(3), HARQ-ACK(4) | Transformation HARQ-ACK state when A = 4 |
|---|---|
| (ACK, ACK, ACK, NACK/DTX, any) | ACK, ACK |
| (ACK, ACK, NACK/DTX, any, any) | NACK/DTX, ACK |
| (ACK, DTX, DTX, DTX, any) or (ACK, ACK, ACK, ACK, ACK) | ACK, NACK/DTX |
| (ACK, ACK, ACK, ACK, NACK/DTX), (ACK, NACK/DTX, any, any, any) except for (ACK, DTX, DTX, DTX, DTX), or (NACK, any, any, any, any) | NACK NACK/DTX |
| (DTX, any, any, any, any) | DTX, NACK/DTX |

As a fourth example, a table is designed to decrease data transmission rate for M=5. Table 10 below represents an example of HARK-ACK compressive transformation for M=5.

TABLE 10

| HARQ-ACK(0), HARQ-ACK(1), HARQ-ACK(2), HARQ-ACK(3), HARQ-ACK(4) | Transformation HARQ-ACK state when A = 4 |
|---|---|
| (ACK, ACK, ACK, NACK/DTX, any) | ACK, ACK |
| (ACK, ACK, NACK/DTX, any, any) | NACK/DTX, ACK |
| (ACK, DTX, DTX, DTX, any) or (ACK, ACK, ACK, ACK, ACK) | ACK, NACK/DTX |
| (ACK, ACK, ACK, ACK, NACK/DTX), (ACK, NACK/DTX, any, any, any) except for (ACK, DTX, DTX, DTX, DTX), or (NACK, any, any, any, any) | NACK, NACK/DTX |
| (DTX, any, any, any, any) | DTX, NACK/DTX |

As a fifth example, a table is designed by distributing appropriately data transmission rate for M=5. Table 11 below represents an example of HARK-ACK compressive transformation for M=5.

TABLE 11

| HARQ-ACK(0), HARQ-ACK(1), HARQ-ACK(2), HARQ-ACK(3), HARQ-ACK(4) | Transformation HARQ-ACK state when A = 4 |
|---|---|
| (ACK, ACK, ACK, ACK, NACK/DTX) | ACK, ACK |
| (ACK, ACK, NACK/DTX, any, any) | NACK/DTX, ACK |
| (ACK, DTX, DTX, DTX, any) or (ACK, ACK, ACK, ACK, ACK) | ACK, NACK/DTX |
| (ACK, ACK, ACK, NACK/DTX, any), (ACK, NACK/DTX, any, any, any) except for (ACK, DTX, DTX, DTX, DTX), or (NACK, any, any, any, any) | NACK, NACK/DTX |
| (DTX, any, any, any, any) | DTX, NACK/DTX |

As a sixth example, a table is designed for M=5. At the moment, the number of HARQ-ACK states which are overlapped is increased. Table 12 below represents an example of HARK-ACK compressive transformation for M=5.

TABLE 12

| HARQ-ACK(0), HARQ-ACK(1), HARQ-ACK(2), HARQ-ACK(3), HARQ-ACK(4) | Transformation HARQ-ACK state when A = 4 |
|---|---|
| (ACK, ACK, ACK, NACK/DTX, any) (ACK, ACK, DTX, DTX, S1) or (ACK, ACK, ACK, ACK, ACK) | ACK, ACK NACK/DTX, ACK |
| (ACK, DTX, DTX, DTX, S2) or (ACK, ACK, ACK, ACK, NACK/DTX) | ACK, NACK/DTX |
| (ACK, ACK, NACK/DTX, any, any) except for (ACK, ACK, DTX, DTX, S1) (ACK, NACK/DTX, any, any, any) except for (ACK, DTX, DTX, DTX, S2), or (NACK, any, any, any, any) | NACK, NACK/DTX |
| (DTX, any, any, any, any) | DTX, NACK/DTX |

In the above table, each of S1 and S2 may be configured as NACK/DTX, or pre-configured as either DTX or 'any'.

In the above transformation HARQ-ACK state, (ACK, ACK) may be configured as (NACK/DTX, ACK), and the opposite case may also be considered. In some cases, the methods of PUCCH resource mapping and configuring modulation symbol may be exchanged each other. In case of a secondary cell, it may be considered by integrating (NACK, NACK/DTX) and (DTX, NACK/DTX) into (NACK/DTX, NACK/DTX) in the transformation HARQ-ACK state.

Table 13 below is an example of HARQ-ACK multiplexing transmission method for M_P cell=4 and M_S cell=5, the case of M=5 corresponds to the case that both S1 and S2 are DTX in the sixth example.

TABLE 13

| Primary cell HARQ-ACK(0), HARQ-ACK(1), HARQ-ACK(2), HARQ-ACK(3) | Secondary cell HARQ-ACK(0), HARQ-ACK(1), HARQ-ACK(2), HARQ-ACK(3), HARQ-ACK(4) | Resource $n^{(1)}_{PUCCH}$ | Constellation b(0), b(1) | RM code input bit o(0), o(1), o(2), o(3) |
|---|---|---|---|---|
| ACK, ACK, ACK, NACK/DTX | ACK, ACK, ACK, NACK/DTX, any | $n^{(1)}_{PUCCH,1}$ | 1, 1 | 1, 1, 1, 1 |
| ACK, ACK, NACK/DTX, any | ACK, ACK, ACK, NACK/DTX, any | $n^{(1)}_{PUCCH,1}$ | 0, 0 | 1, 0, 1, 1 |
| ACK, DTX, DTX, DTX | ACK, ACK, ACK, NACK/DTX, any | $n^{(1)}_{PUCCH,3}$ | 1, 1 | 0, 1, 1, 1 |
| ACK, ACK, ACK, ACK | ACK, ACK, ACK, NACK/DTX, any | $n^{(1)}_{PUCCH,3}$ | 1, 1 | 0, 1, 1, 1 |
| NACK/DTX, any, any, any | ACK, ACK, ACK, NACK/DTX, any | $n^{(1)}_{PUCCH,3}$ | 0, 1 | 0, 0, 1, 1 |
| (ACK, NACK/DTX, any, any), except for (ACK, DTX, DTX, DTX) | ACK, ACK, ACK, NACK/DTX, any | $n^{(1)}_{PUCCH,3}$ | 0, 1 | 0, 0, 1, 1 |
| ACK, ACK, ACK, NACK/DTX | ACK, ACK, DTX, DTX, DTX | $n^{(1)}_{PUCCH,0}$ | 1, 0 | 1, 1, 1, 0 |
| ACK, ACK, ACK, NACK/DTX | ACK, ACK, ACK, ACK, ACK | $n^{(1)}_{PUCCH,0}$ | 1, 0 | 1, 1, 1, 0 |
| ACK, ACK, NACK/DTX, any | ACK, ACK, DTX, DTX, DTX | $n^{(1)}_{PUCCH,3}$ | 1, 0 | 1, 0, 1, 0 |
| ACK, ACK, NACK/DTX, any | ACK, ACK, ACK, ACK, ACK | $n^{(1)}_{PUCCH,3}$ | 1, 0 | 1, 0, 1, 0 |
| ACK, DTX, DTX, DTX | ACK, ACK, DTX, DTX, DTX | $n^{(1)}_{PUCCH,0}$ | 0, 1 | 0, 1, 1, 0 |
| ACK, DTX, DTX, DTX | ACK, ACK, ACK, ACK, ACK | $n^{(1)}_{PUCCH,0}$ | 0, 1 | 0, 1, 1, 0 |
| ACK, ACK, ACK, ACK | ACK, ACK, DTX, DTX, DTX | $n^{(1)}_{PUCCH,0}$ | 0, 1 | 0, 1, 1, 0 |
| ACK, ACK, ACK, ACK | ACK, ACK, ACK, ACK, ACK | $n^{(1)}_{PUCCH,0}$ | 0, 1 | 0, 1, 1, 0 |
| NACK/DTX, any, any, any | ACK, ACK, DTX, DTX, DTX | $n^{(1)}_{PUCCH,3}$ | 0, 0 | 0, 0, 1, 0 |

TABLE 13-continued

| Primary cell HARQ-ACK(0), HARQ-ACK(1), HARQ-ACK(2), HARQ-ACK(3) | Secondary cell HARQ-ACK(0), HARQ-ACK(1), HARQ-ACK(2), HARQ-ACK(3), HARQ-ACK(4) | Resource $n^{(1)}_{PUCCH}$ | Constellation b(0), b(1) | RM code input bit o(0), o(1), o(2), o(3) |
|---|---|---|---|---|
| NACK/DTX, any, any, any | ACK, ACK, ACK, ACK, ACK | $n^{(1)}_{PUCCH,3}$ | 0, 0 | 0, 0, 1, 0 |
| (ACK, NACK/DTX, any, any), except for (ACK, DTX, DTX, DTX) | ACK, ACK, DTX, DTX, DTX | $n^{(1)}_{PUCCH,3}$ | 0, 0 | 0, 0, 1, 0 |
| (ACK, NACK/DTX, any, any), except for (ACK, DTX, DTX, DTX) | ACK, ACK, ACK, ACK, ACK | $n^{(1)}_{PUCCH,3}$ | 0, 0 | 0, 0, 1, 0 |
| ACK, ACK, ACK, NACK/DTX | ACK, DTX, DTX, DTX, DTX | $n^{(1)}_{PUCCH,2}$ | 1, 1 | 1, 1, 0, 1 |
| ACK, ACK, ACK, NACK/DTX | ACK, ACK, ACK, ACK, NACK/DTX | $n^{(1)}_{PUCCH,2}$ | 1, 1 | 1, 1, 0, 1 |
| ACK, ACK, NACK/DTX, any | ACK, DTX, DTX, DTX, DTX | $n^{(1)}_{PUCCH,2}$ | 0, 1 | 1, 0, 0, 1 |
| ACK, ACK, NACK/DTX, any | ACK, ACK, ACK, ACK, NACK/DTX | $n^{(1)}_{PUCCH,2}$ | 0, 1 | 1, 0, 0, 1 |
| ACK, DTX, DTX, DTX | ACK, DTX, DTX, DTX, DTX | $n^{(1)}_{PUCCH,2}$ | 1, 0 | 0, 1, 0, 1 |
| ACK, DTX, DTX, DTX | ACK, ACK, ACK, ACK, NACK/DTX | $n^{(1)}_{PUCCH,2}$ | 1, 0 | 0, 1, 0, 1 |
| ACK, ACK, ACK, ACK | ACK, DTX, DTX, DTX, DTX | $n^{(1)}_{PUCCH,2}$ | 1, 0 | 0, 1, 0, 1 |
| ACK, ACK, ACK, ACK | ACK, ACK, ACK, ACK, NACK/DTX | $n^{(1)}_{PUCCH,2}$ | 1, 0 | 0, 1, 0, 1 |
| NACK/DTX, any, any, any | ACK, DTX, DTX, DTX, DTX | $n^{(1)}_{PUCCH,2}$ | 0, 0 | 0, 0, 0, 1 |
| NACK/DTX, any, any, any | ACK, ACK, ACK, ACK, NACK/DTX | $n^{(1)}_{PUCCH,2}$ | 0, 0 | 0, 0, 0, 1 |
| (ACK, NACK/DTX, any, any), except for (ACK, DTX, DTX, DTX) | ACK, DTX, DTX, DTX, DTX | $n^{(1)}_{PUCCH,2}$ | 0, 0 | 0, 0, 0, 1 |
| (ACK, NACK/DTX, any, any), except for (ACK, DTX, DTX, DTX) | ACK, ACK, ACK, ACK, NACK/DTX | $n^{(1)}_{PUCCH,2}$ | 0, 0 | 0, 0, 0, 1 |
| ACK, ACK, ACK, NACK/DTX | NACK/DTX, any, any, any, any | $n^{(1)}_{PUCCH,1}$ | 1, 0 | 1, 1, 0, 0 |
| ACK, ACK, ACK, NACK/DTX | (ACK, NACK/DTX, any, any, any), except for (ACK, DTX, DTX, DTX, DTX) | $n^{(1)}_{PUCCH,1}$ | 1, 0 | 1, 1, 0, 0 |
| ACK, ACK, ACK, NACK/DTX | (ACK, ACK, NACK/DTX, any, any), except for (ACK, ACK, DTX, DTX, DTX) | $n^{(1)}_{PUCCH,1}$ | 1, 0 | 1, 1, 0, 0 |
| ACK, ACK, NACK/DTX, any | NACK/DTX, any, any, any, any | $n^{(1)}_{PUCCH,1}$ | 0, 1 | 1, 0, 0, 0 |
| ACK, ACK, NACK/DTX, any | (ACK, NACK/DTX, any, any, any), except for (ACK, DTX, DTX, DTX, DTX) | $n^{(1)}_{PUCCH,1}$ | 0, 1 | 1, 0, 0, 0 |
| ACK, ACK, NACK/DTX, any | (ACK, ACK, NACK/DTX, any, any), except for (ACK, ACK, DTX, DTX, DTX) | $n^{(1)}_{PUCCH,1}$ | 0, 1 | 1, 0, 0, 0 |
| ACK, DTX, DTX, DTX | NACK/DTX, any, any, any, any | $n^{(1)}_{PUCCH,0}$ | 1, 1 | 0, 1, 0, 0 |
| ACK, DTX, DTX, DTX | (ACK, NACK/DTX, any, any, any), except for (ACK, DTX, DTX, DTX, DTX) | $n^{(1)}_{PUCCH,0}$ | 1, 1 | 0, 1, 0, 0 |

TABLE 13-continued

| Primary cell HARQ-ACK(0), HARQ-ACK(1), HARQ-ACK(2), HARQ-ACK(3) | Secondary cell HARQ-ACK(0), HARQ-ACK(1), HARQ-ACK(2), HARQ-ACK(3), HARQ-ACK(4) | Resource $n^{(1)}_{PUCCH}$ | Constellation b(0), b(1) | RM code input bit o(0), o(1), o(2), o(3) |
|---|---|---|---|---|
| ACK, DTX, DTX, DTX | (ACK, ACK, NACK/DTX, any, any), except for (ACK, ACK, DTX, DTX, DTX) | $n^{(1)}_{PUCCH,0}$ | 1, 1 | 0, 1, 0, 0 |
| ACK, ACK, ACK, ACK | NACK/DTX, any, any, any, any | $n^{(1)}_{PUCCH,0}$ | 1, 1 | 0, 1, 0, 0 |
| ACK, ACK, ACK, ACK | (ACK, NACK/DTX, any, any, any), except for (ACK, DTX, DTX, DTX, DTX) | $n^{(1)}_{PUCCH,0}$ | 1, 1 | 0, 1, 0, 0 |
| ACK, ACK, ACK, ACK | (ACK, ACK, NACK/DTX, any, any), except for (ACK, ACK, DTX, DTX, DTX) | $n^{(1)}_{PUCCH,0}$ | 1, 1 | 0, 1, 0, 0 |
| NACK, any, any, any | NACK/DTX, any, any, any, any | $n^{(1)}_{PUCCH,0}$ | 0, 0 | 0, 0, 0, 0 |
| NACK, any, any, any | (ACK, NACK/DTX, any, any, any), except for (ACK, DTX, DTX, DTX, DTX) | $n^{(1)}_{PUCCH,0}$ | 0, 0 | 0, 0, 0, 0 |
| NACK, any, any, any | (ACK, ACK, NACK/DTX, any, any), except for (ACK, ACK, DTX, DTX, DTX) | $n^{(1)}_{PUCCH,0}$ | 0, 0 | 0, 0, 0, 0 |
| (ACK, NACK/DTX, any, any), except for (ACK, DTX, DTX, DTX) | NACK/DTX, any, any, any, any | $n^{(1)}_{PUCCH,0}$ | 0, 0 | 0, 0, 0, 0 |
| (ACK, NACK/DTX, any, any), except for (ACK, DTX, DTX, DTX) | (ACK, NACK/DTX, any, any, any), except for (ACK, DTX, DTX, DTX, DTX) | $n^{(1)}_{PUCCH,0}$ | 0, 0 | 0, 0, 0, 0 |
| (ACK, NACK/DTX, any, any), except for (ACK, DTX, DTX, DTX) | (ACK, ACK, NACK/DTX, any, any), except for (ACK, ACK, DTX, DTX, DTX) | $n^{(1)}_{PUCCH,0}$ | 0, 0 | 0, 0, 0, 0 |
| DTX, any, any, any | NACK/DTX, any, any, any, any | No Transmission | | 0, 0, 0, 0 |
| DTX, any, any, any | (ACK, NACK/DTX, any, any, any), except for (ACK, DTX, DTX, DTX, DTX) | No Transmission | | 0, 0, 0, 0 |
| DTX, any, any, any | (ACK, ACK, NACK/DTX, any, any), except for (ACK, ACK, DTX, DTX, DTX) | No Transmission | | 0, 0, 0, 0 |

2) HARQ-ACK Bundling Method

As another method, a method may be considered to adjust a maximum value of M to 4 by utilizing HARQ-ACK bundling. Through this, the HARQ-ACK may be transmitted in the same way of PUCCH format 1b of the conventional 3GPP LTE Rel-11 that is available for channel selection. The HARQ-ACK bundling may be applied to the case that the number M of the DL subframe related to a UL subframe on which a PUCCH is to be transmitted. As a more detailed example, the method may be applied to the case of performing the HARQ-ACK bundling in case that the number of channel scheduled (or the number of subframe including PDCCH/EPDCCH that represents PDSCH transmission or DL SPS release) when scheduling physical channels in which HARQ-ACK to a UE is required for M=j (j>4). In the embodiments of the present invention, the PDCCH/EPD-CCH that represents PDSCH transmission scheduled in $k^{th}$ order or DL SPS release or the subframe including this is referred to raw DAI. The HARQ-ACK bundling may be performed for the HARQ-ACK for physical channels that corresponds to raw DAI>4 and the HARQ-ACK for physical channels that corresponds to raw DAI=4 (or DAI). As a detailed example, bundling of the HARQ-ACK for $5^{th}$ channel (hereinafter, referred to a channel that corresponds to raw DAI=5), when the number of channel which is scheduled is 5, may be performed by the HARQ-ACK that corresponds to raw DAI=4 or by the method shown in Table 14 below.

TABLE 14

| HARQ-ACK for raw DAI = 4 (HARQ-ACK(3)) HARQ-ACK for raw DAI = 5 (HARQ-ACK(4)) | Bundled HARQ-ACK |
|---|---|
| ACK, ACK | ACK |
| ACK, NACK | NACK or DTX or NACK/DTX |

TABLE 14-continued

| HARQ-ACK for raw DAI = 4 (HARQ-ACK(3)) HARQ-ACK for raw DAI = 5 (HARQ-ACK(4)) | Bundled HARQ-ACK |
|---|---|
| ACK, DTX | NACK or DTX or NACK/DTX |
| DTX, ACK | DTX |
| DTX, NACK | DTX |
| DTX, DTX | DTX |

In the above table, the reason why considering only either ACK or DTX is because (ACK, DTX, DTX, DTX) states are not separately distinguished in case of DTX in the existing table for PUCCH format 1b that is available for channel selection, and for the rest case, the HARQ-ACK after the case that the previous HARQ-ACK is NACK/DTX is not separately distinguished. In the table above, the HARQ-ACK for raw DAI=5 means that HARQ-ACK bundling is performed for all HARQ-ACKs of which raw DAI value exceeds 4 when the number of scheduled channel is 6 or more. It may be limited that the additional HARQ-ACK bundling follows AND operation basically, and that of including DTX follows Table 14 above.

For the HARQ-ACK for raw DAI=5, the case of DTX may be the case that an eNodeB does not perform scheduling actually, or may be generated owing to PDCCH missing on an UE end although scheduling is performed. In this case, in case that (ACK, DTX) is disposed by NACK as shown in Table 13 above, HARQ-ACK may not be properly expressed for raw DAI=4. Accordingly, in case that the physical channel that corresponds to raw DAI=4 (or DAI=4, HARQ-ACK(3)) is transmitted in the latest (the last) DL subframe among the DL subframes related to the UL subframe to transmit PUCCH, the HARQ-ACK bundling may not be performed. That is, in this case, since there is no possibility that the PDCCH of which raw DAI=5 is transmitted and a UE loses this, there is no reason to perform the HARQ-ACK bundling. That is, in the situation of raw M=5, in case that HARQ-ACK (HARQ-ACK(3)) for DAI=4 is ACK, it is disposed by ACK, and in case of NACK, it is disposed by NACK. That is, in case that an eNodeB schedules until raw DAI=4, it is prevented that HARQ-ACK response is disposed by NACK for DAI=4 by scheduling DAI=4 to the last subframe (fifth subframe in case of M=5 and sixth subframe in case of M=6). That is, in this case, even though HARQ-ACK(4) is set to DTX, HARQ-ACK(3) and HARQ-ACK(4) are not bundled. In this embodiment, the description for raw DAI=4, raw DAI=5 or 6 is just for example, and M value (4, in the embodiment) used for transmitting PUCCH format 1b that is available for channel selection and a maximum scheduling number (5, in the embodiment) of channels that HARQ-ACK is required may be expanded from the inventive concept of the present invention.

In the above description, although it is described that downlink control information (DCI) is transmitted on a PDCCH for the convenience of description, but not limited to this, and it is also possible to be transmitted on a PDCCH. In the above description, in case that DAI field is limited to 2 bits, a value of 5 or more cannot be directly indicated, but a value of field the same as DAI=1 may be used, for example. A value of raw DAI=5 or more is indirectly detected through history of DAI value in the previous PDCCH which is transmitted in a DL subframe related to a UL subframe to transmit a PUCCH.

(3) HARQ-ACK Bit Configuration Method when Transmitting Through PUCCH Format 3

In PUCCH format 3, an input bit number for HARQ-ACK is configured as maximum 20 bits. When performing the TDD-FDD CA, increase of overall HARQ-ACK bit number owing to the use of remaining DL subframe of an FDD cell may be supported by utilizing additional HARQ-ACK bundling. The HARQ-ACK bundling may be performed for each cell. In addition, the HARQ-ACK bundling may be time domain bundling. The time domain bundling may utilize a sequential ACK counter.

M value is configured as a total number of DL subframes related to the corresponding UL subframe including the DL subframe of an FDD cell aligned with the UL subframe in a TDD cell (hereinafter, an FDD remaining DL subframe), and bundling is performed according to the M value. The sequential ACK counter may be expressed by the table below when M=3 and 4. It may be considered that in case that M is 5 or more, the bundling is performed using the table that corresponds to M=4 from MSB to 4 bits, and the bundling is not performed for remaining bits. Otherwise, instead of compressing final 2 bits per cell, it may be considered to decrease bit number in a way of expressing ACK, ACK, . . . , NACK/DTX, any by extending the way of M=3. More particularly, a size of bit bundled for each cell is designed not to exceed 4. Table 17 below is an example of designing for the case of M=5. In Table 17 below, the remaining states may be used for subdividing HARQ-ACK combination. In this case, a DAI value configuration may be designated for all DL subframes that are aligned with a UL subframe for each cell.

As another method, by dividing a DL subframe aligned with a UL subframe in a TDD cell into two groups, M value is designated for each group, and bundling is performed in a time domain. The two DL subframe groups may be distinguished whether the group includes FDD remaining DL subframe. As an example, by excluding the DL subframe of an FDD cell (hereinafter, FDD remaining subframe), M_1 value is configured as a total number of the DL subframe related to the corresponding UL subframe, and bundling is performed according to the M_1 value. And, for the FDD remaining DL subframe, M_2 value is configured as a total number of the FDD remaining DL subframes related to the corresponding UL subframe, and bundling is performed according to the M_2 value. In this case, the DAI value configuration may be separately configured for the FDD remaining DL subframes and the rest DL subframes for the DL subframe aligned with the UL subframe for each cell. That is, in this case, there are two sort of DAI values per each UL subframe.

Table 15 below represents a sequential ACK counter for M=3.

TABLE 15

| HARQ-ACK(0), HARQ-ACK(1), HARQ-ACK(2) | Bundled bit |
|---|---|
| ACK, ACK, ACK | 1, 1 |
| ACK, ACK, NACK/DTX | 1, 0 |
| ACK, NACK/DTX, any | 0, 1 |
| NACK/DTX, any, any | 0, 0 |

Table 16 below represents a sequential ACK counter for M=4.

TABLE 16

| HARQ-ACK(0), HARQ-ACK(1), HARQ-ACK(2), HARQ-ACK(3) | Bundled bit |
|---|---|
| ACK, ACK, ACK, NACK/DTX | 1, 1 |
| ACK, ACK, NACK/DTX, any | 1, 0 |
| ACK, DTX, DTX, DTX | 0, 1 |
| ACK, ACK, ACK, ACK | 0, 1 |
| NACK/DTX, any, any, any | 0, 0 |
| (ACK, NACK/DTX, any, any), except for (ACK, DTX, DTX, DTX) | 0, 0 |

Table 17 below represents a sequential ACK counter for M=5.

TABLE 17

| HARQ-ACK(0), HARQ-ACK(1), HARQ-ACK(2), HARQ-ACK(3), HARQ-ACK(4) | Bundled bit |
|---|---|
| ACK, ACK, ACK, ACK, ACK | 1, 1, 1 |
| ACK, ACK, ACK, ACK, NACK/DTX | 1, 1, 0 |
| ACK, ACK, ACK, NACK/DTX, any | 1, 0, 0 |
| ACK, ACK, NACK/DTX, any, any | 0, 1, 0 |
| ACK, NACK/DTX, any, any, any | 0, 0, 1 |
| NACK/DTX, any, any, any, any | 0, 0, 0 |

Followings are more detailed examples for the bundling application time.

As a first example, in case that a bit number of HARQ-ACK to transmit exceeds 20, the time domain bundling is performed for each cell.

As a second example, in case that a UE which is available to perform the TDD-FDD CA configures both of a TDD cell and an FDD cell, the time domain bundling is performed for each cell.

As a third example, whether to perform the time domain bundling is configured through a higher layer signal. More particularly, in case that a bit number of HARQ-ACK exceeds 20 while the time domain bundling is not configured, it may be that a part of the remaining DL subframes of the FDD cell are not used.

Followings are detailed examples for application method of the bundling according to an application time.

As a first example, under the condition that the time domain bundling is performed, for all cells, the time domain bundling is performed for each cell.

As a second example, under the condition that the time domain bundling is performed, for the rest cells excluding a primary cell, the time domain bundling is performed for each cell.

As a third example, under the condition that the time domain bundling is performed, for a part of the cells, the time domain bundling is performed for each cell. Here, a part of the cells may be FDD cells or the cell that includes the FDD remaining DL subframe.

(4) Introduction of New PUCCH Format

Different from the conventional 3GPP LTE REl-11 system, in a situation of the TDD-FDD CA, the situation that does not support five cells with PUCCH format 3 may occur more frequently. According to this, a limitation of the cell number which is an object of a maximum CA may degrade a flexibility of network eventually. As a method for solving this, an introduction of new PUCCH format may be considered. As a more detailed example, based on a PUSCH form that occupies 1 RB for each slot, a new PUCCH resource may be allocated. This may be applied only to the case of TDD-FDD CA, or may be applied only to the case that there is higher layer signal.

As another method, a transmission by utilizing a plurality of PUCCH resources may be considered. At the moment, through a first PUCCH resource, the HARQ-ACK for a DL subframe excluding the FDD remaining DL subframe may be transmitted, and through a second PUCCH resource, the HARQ-ACK for the FDD remaining DL subframe may be transmitted. The additional PUCCH resource may be configured by a higher layer, or expressed as a function of the first PUCCH resource.

(5) PUSCH Piggyback

As described above, the bundling method or the number of HARQ-ACK bit may be changed depending on whether to use PUCCH format 1b that is available for channel selection or PUCCH format 3 when HARQ-ACK is transmitted on a PUCCH. A situation in which HARQ-ACK is transmitted by being piggybacked to a PUSCH such as a situation in which a PUCCH and a PUSCH are not configured to be simultaneously transmitted may be considered. It may be considered to configure that the bundling may be dismantled when transmitting HARQ-ACK on a PUSCH even in a situation that bundling is performed when transmitting HARQ-ACK on a PUCCH. Here, the dismantle means to revert the corresponding bundling to the former state before bundling is performed. In the above description, among the object of bundling, spatial bundling may be excluded, and whether to dismantle bundling may be limited to be configured through UL grant. As an example, whether to dismantle bundling for the HARQ-ACK to be transmitted on a PUSCH may be configured according to UL DAI value. Additionally, this case may correspond to a case that a maximum number of aggregated cells are limited. More particularly, among the object of bundling, the bundling that corresponds to raw DAI>4 may also be excluded additionally, for the case that the cell number of maximum aggregation is not limited.

As another method of approach, regardless of whether PUCCH format 1b that is available for channel selection or PUCCH format 3 is used, it may be considered that the HARQ-ACK to be transmitted on a PUSCH borrows the HARQ-ACK to be transmitted on a PUCCH as it is. That is, the case may be interpreted that the bundling techniques applied when transmitting on a PUCCH is also considered when transmitting on a PUSCH.

IV. Supporting Method for Cross-Carrier Scheduling

It may be considered to introduce the cross-carrier scheduling between cells that construct CA for a UE that performs the TDD-FDD CA. This may applied only to the case of using the same frame structure type for the relation between a scheduling cell and a scheduled cell. That is, it may be considered that an FDD cell may be scheduled only as an FDD cell and a TDD may be scheduled only as a TDD cell. Considering a UL HARQ timing, it may be efficient that the cross-carrier scheduling is applied only between the cells that have the same frame structure type. In case of a DL HARQ timing, an FDD cell may use as many DL subframes as possible by utilizing the HARQ timing scheduled by the FDD cell by itself. On the other hand, in case that a TDD cell is a primary cell, different TDD configuration methods may be utilized, and in case that an FDD cell is a primary cell, a part of DL subframe may be lost according to a configuration set. As another method, when introducing the cross-carrier scheduling in the TDD-FDD CA, a frame structure type for scheduling cell may be provided only for FDD. This method has an advantage that a restriction due to a scheduling cell may be avoided in an FDD in which DL and UL are always available.

V. Method of Limiting HARQ Timing

As described above, in case that a TDD cell is a primary cell, and in case of designating a new HARQ-ACK timing for supporting HARQ-ACK feedback for DL subframes of all FDD secondary cell according to a UL-DL configuration, a complexity of UE may be increased.

Accordingly, the present invention proposes a method of applying only a part of HARQ timing shown in Table 5 to the UL-DL configuration of all TDD primary cells. Particularly, in UL-DL configuration 1 of Table 5, the timing defined by an arbitrary way may make it possible the HARQ-ACK payload distribution through four subframes. And an arbitrary way in UL-DL configuration 2 and an arbitrary way in UL-DL configuration 4 may make it possible the distribution through two subframes for UL-DL configuration of 5 ms period and UL-DL configuration of 10 ms period, respectively. For example, the HARQ timing shown in Table 18 below may be defined.

TABLE 18

| UL-DL configuration of TDD primary cell | Reference configuration allowed for FDD secondary cell (HARQ timing from Table 5) |
|---|---|
| 0 | 1 |
| 1 | 1 |
| 2 | 2 |
| 3 | 4 |
| 4 | 4 |
| 5 | 5 |
| 6 | 1 |

The embodiments of the present invention described so far may be implemented through various means. For example, the embodiments of the present invention may be implemented by hardware, firmware, software or the combination thereof. Particularly, this will be described by reference to drawing.

Figure 13:
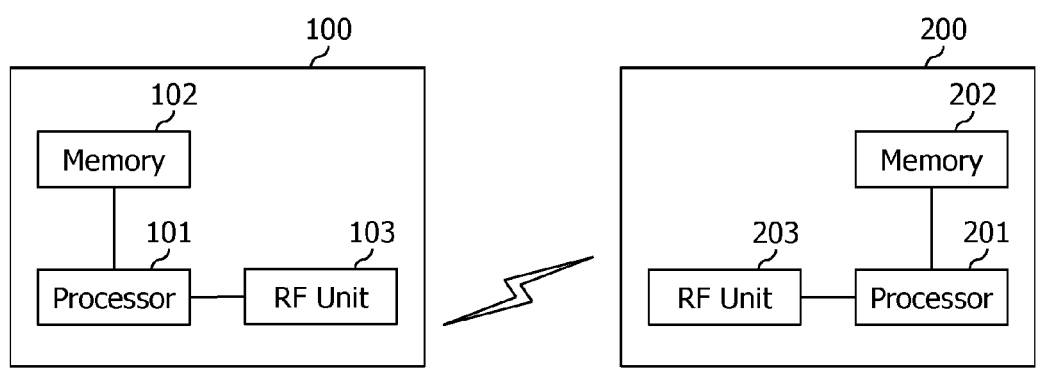
FIG. 13 is a block diagram illustrating a wireless communication system in which a disclosure of the present specification is implemented.

FIG. 13 is a block diagram illustrating a wireless communication system in which a disclosure of the present specification is implemented.

ABS 200 includes a processor 201, a memory 202, and an RF (radio frequency) unit (the MTC device) 203. The memory 202 which is coupled to the processor 201 stores a variety of information for driving the processor 201. The RF unit 203 which is coupled to the processor 201 transmits and/or receives a radio signal. The processor 201 implements the proposed functions, procedure, and/or methods. In the embodiments described above, the operation of BS may be implemented by the processor 201.

A user equipment (UE) 100 includes a processor 101, a memory 102, and an RF (radio frequency) unit 103. The memory 102 which is coupled to the processor 101 stores a variety of information for driving the processor 101. The RF unit 103 which is coupled to the processor 101 transmits and/or receives a radio signal. The processor 101 implements the proposed functions, procedure, and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing a hybrid automatic retransmit request (HARQ) operation, the method performed by a user equipment (UE) and comprising:
   determining, by the UE, a physical uplink control channel (PUCCH) format to be used,
   wherein the UE is configured with a carrier aggregation (CA) including at least one time division duplex (TDD)-based cell and at least one frequency division duplex (FDD)-based cell,
   wherein the at least one TDD-based cell is configured as a primary cell,
   wherein the at least one FDD-based cell is configured as a secondary cell;
   determining a number of HARQ ACK/NACK bits to be transmitted using the determined PUCCH format; and
   generating and transmitting a PUCCH signal using the PUCCH format,
   wherein a maximum number of cells included in the CA is limited such that the determined number of HARQ ACK/NACK bits does not exceed a maximum number of bits allowed in the PUCCH format if an uplink-downlink (UL-DL) configuration of the at least one TDD-based cell corresponding to the primary cell corresponds to one of UL-DL configurations 2, 3 or 4, and if the at least one FDD-based cell is configured as the secondary cell.

2. The method of claim 1, wherein
   if the PUCCH format corresponds to a PUCCH format 3 so that the allowed maximum number of bits is 20, the maximum number cells included in the CA is limited.

3. The method of claim 1,
   wherein if the UL-DL configuration of at least one TDD-based cell corresponding to the primary cell corresponds to UL-DL configuration 5, the maximum number cells included in the CA is limited.

4. The method of claim 1, further comprising:
   receiving a radio resource control (RRC) signal including a configuration for the PUCCH format.

5. The method of claim 1, wherein the CA includes:
   the primary cell based on TDD, at least one or more secondary cells based on FDD, and at least one or more secondary cells based on TDD.

6. A method for receiving a hybrid automatic retransmit request (HARQ) ACK/NACK, the method performed by a base station and comprising:
   configuring, by the base station, a carrier aggregation (CA) including at least one time division duplex (TDD)-based cell and at least one frequency division duplex (FDD)-based cell, wherein the at least one TDD-based cell is configured as a primary cell,
wherein the at least one FDD-based cell is configured as a secondary cell;
determining, by the base station, a physical uplink control channel (PUCCH) format to be used by a user equipment (UE);
transmitting, by the base station, downlink data to the UE; and
receiving the HARQ ACK/NACK with respect to the downlink data,
wherein a maximum number of cells included in the CA is limited such that a number of bits of the received HARQ ACK/NACK does not exceed a maximum number of bits allowed in the PUCCH format if an uplink-downlink (UL-DL) configuration of the at least one TDD-based cell corresponding to the primary cell corresponds to one of UL-DL configurations 2, 3 or 4, and if the at least one FDD-based cell is configured as the secondary cell.

7. The method of claim 6, wherein
if the PUCCH format corresponds to a PUCCH format 3 so that the allowed maximum number of bits is 20, the maximum number cells included in the CA is limited.

8. The method of claim 6,
wherein if the UL-DL configuration of at least one TDD-based cell corresponding to the primary cell corresponds to UL-DL configuration 5, the maximum number cells included in the CA is limited.

9. The method of claim 6, further comprising:
transmitting a radio resource control (RRC) signal including a configuration for the determined PUCCH format.

10. The method of claim 6, wherein the CA includes:
the primary cell based on TDD, at least one or more secondary cells based on FDD, and at least one or more secondary cells based on TDD.

11. A user equipment (UE) for performing a hybrid automatic retransmit request (HARQ) operation, the UE comprising:
a transceiver configured with a carrier aggregation (CA) including at least one time division duplex (TDD)-based cell and at least one frequency division duplex (FDD)-based cell,
wherein the at least one TDD-based cell is configured as a primary cell, and
wherein the at least one FDD-based cell is configured as a secondary cell; and
a processor configured to control the transceiver and perform:
determining a physical uplink control channel (PUCCH) format to be used;
determining a number of HARQ ACK/NACK bits to be transmitted using the determined PUCCH format; and
generating and transmitting a PUCCH signal using the PUCCH format, wherein a maximum number of cells included in the CA is limited such that the determined number of HARQ ACK/NACK bits does not exceed a maximum number of bits allowed in the PUCCH format if an uplink-downlink (UL-DL) configuration of the at least one TDD-based cell corresponding to the primary cell corresponds to one of UL-DL configurations 2, 3 or 4, and if the at least one FDD-based cell is configured as the secondary cell.

* * * * *